(12) United States Patent
Langley et al.

(10) Patent No.: US 9,292,870 B2
(45) Date of Patent: Mar. 22, 2016

(54) SYSTEM AND METHOD FOR POINT OF SERVICE PAYMENT ACCEPTANCE VIA WIRELESS COMMUNICATION

(75) Inventors: Garrett S. Langley, Atlanta, GA (US); Bradley A. Slutsky, Atlanta, GA (US); Ben D. Ackerman, Atlanta, GA (US); Joe T. Wei, Santa Clara, CA (US)

(73) Assignee: Qualcomm Incorporated, San Diego, CA (US)

( * ) Notice: Subject to any disclaimer, the term of this patent is extended or adjusted under 35 U.S.C. 154(b) by 0 days.

(21) Appl. No.: 13/153,215

(22) Filed: Jun. 3, 2011

(65) Prior Publication Data

US 2012/0150669 A1 Jun. 14, 2012

Related U.S. Application Data

(60) Provisional application No. 61/422,606, filed on Dec. 13, 2010, provisional application No. 61/438,164, filed on Jan. 31, 2011, provisional application No. 61/454,721, filed on Mar. 21, 2011.

(51) Int. Cl.
*G06Q 30/06* (2012.01)
*G06Q 20/12* (2012.01)
*G06Q 20/08* (2012.01)
(Continued)

(52) U.S. Cl.
CPC .......... *G06Q 30/0601* (2013.01); *G06Q 20/027* (2013.01); *G06Q 20/06* (2013.01); *G06Q 20/085* (2013.01); *G06Q 20/102* (2013.01); *G06Q 20/1235* (2013.01); *G06Q 20/204* (2013.01); *G06Q 20/322* (2013.01);
(Continued)

(58) Field of Classification Search
None
See application file for complete search history.

(56) References Cited

U.S. PATENT DOCUMENTS 5,859,779 A   1/1999  Giordano et al.
6,714,797 B1 * 3/2004  Rautila ...................... 455/552.1
(Continued)

FOREIGN PATENT DOCUMENTS

EP       2026266 A1    2/2009
JP    2009048627 A    3/2009
(Continued)

OTHER PUBLICATIONS

See definition of "portable". Random House Dictionary, 2012.*
(Continued)

*Primary Examiner* — Peter L Ludwig
(74) *Attorney, Agent, or Firm* — Joseph Hanasz

(57) ABSTRACT

A system and method for remitting payment from a consumer's credit or stored value account by digital presentations of account information are described. A merchant may create one or more merchant account at a point-of-sale service site ("POS service site") and associate one or more merchant portable computing devices ("MPCDs") with one or more of the merchant accounts. Each MPCD may be configured to receive customer data from a customer via one of a visual capture and a wireless communication, such as a near field communication ("NFC") or a machine-readable optical code. The customer data may be received from an NFC-capable physical token such as an EMV card, or a virtual token presented by a customer portable computing device ("CPCD") using a NFC or a machine-readable optical code. Each MPCD may contain a point-of-sale payment application supplied by the POS service site that may capture data representative of a consumer account from the received customer data.

34 Claims, 14 Drawing Sheets

(51) Int. Cl.

| | | |
|---|---|---|
| *G06Q 20/32* | (2012.01) | |
| *G06Q 20/34* | (2012.01) | |
| *G06Q 20/06* | (2012.01) | |
| *G06Q 20/02* | (2012.01) | |
| *G06Q 20/20* | (2012.01) | |
| *G06Q 20/10* | (2012.01) | |

(52) U.S. Cl.
CPC ....... *G06Q 20/3223* (2013.01); *G06Q 20/3227* (2013.01); *G06Q 20/3278* (2013.01); *G06Q 20/356* (2013.01)

(56) References Cited

U.S. PATENT DOCUMENTS

| | | | | |
|---|---|---|---|---|
| 7,200,578 | B2* | 4/2007 | Paltenghe et al. | 705/74 |
| 7,325,725 | B2* | 2/2008 | Foss, Jr. | 235/380 |
| 7,363,054 | B2 | 4/2008 | Elias et al. | |
| 7,529,563 | B1* | 5/2009 | Pitroda | 455/558 |
| 7,822,688 | B2* | 10/2010 | Labrou et al. | 705/67 |
| 2002/0004783 | A1* | 1/2002 | Paltenghe et al. | 705/41 |
| 2005/0027543 | A1* | 2/2005 | Labrou et al. | 705/1 |
| 2005/0086164 | A1* | 4/2005 | Kim et al. | 705/40 |
| 2005/0187873 | A1* | 8/2005 | Labrou et al. | 705/40 |
| 2006/0006226 | A1* | 1/2006 | Fitzgerald et al. | 235/380 |
| 2007/0106564 | A1* | 5/2007 | Matotek et al. | 705/26 |
| 2007/0205275 | A1* | 9/2007 | Nicola et al. | 235/383 |
| 2007/0233615 | A1* | 10/2007 | Tumminaro | 705/75 |
| 2007/0255653 | A1* | 11/2007 | Tumminaro et al. | 705/39 |
| 2008/0040265 | A1* | 2/2008 | Rackley, III et al. | 705/40 |
| 2008/0162318 | A1* | 7/2008 | Butler et al. | 705/35 |
| 2008/0177662 | A1* | 7/2008 | Smith et al. | 705/44 |
| 2008/0208762 | A1* | 8/2008 | Arthur et al. | 705/79 |
| 2008/0275779 | A1* | 11/2008 | Lakshminarayanan | 705/14 |
| 2009/0006254 | A1* | 1/2009 | Mumm et al. | 705/44 |
| 2009/0063312 | A1* | 3/2009 | Hurst | 705/30 |
| 2009/0192935 | A1 | 7/2009 | Griffin et al. | |
| 2009/0254440 | A1* | 10/2009 | Pharris | 705/17 |
| 2009/0319425 | A1* | 12/2009 | Tumminaro et al. | 705/42 |
| 2010/0030651 | A1* | 2/2010 | Matotek et al. | 705/17 |
| 2010/0044433 | A1 | 2/2010 | Wankmueller et al. | |
| 2010/0088188 | A1* | 4/2010 | Kumar et al. | 705/17 |
| 2010/0153221 | A1* | 6/2010 | Esplin et al. | 705/17 |
| 2010/0161433 | A1 | 6/2010 | White | |
| 2010/0198728 | A1 | 8/2010 | Aabye et al. | |
| 2011/0099108 | A1* | 4/2011 | Fung et al. | 705/44 |
| 2011/0238571 | A1* | 9/2011 | O'Leary et al. | 705/41 |
| 2012/0005726 | A1* | 1/2012 | Pitroda et al. | 726/3 |
| 2012/0011063 | A1 | 1/2012 | Killian et al. | |
| 2012/0123924 | A1* | 5/2012 | Rose et al. | 705/35 |

FOREIGN PATENT DOCUMENTS

| | | |
|---|---|---|
| JP | 2009529732 A | 8/2009 |
| JP | 2010015287 A | 1/2010 |
| WO | WO-2007103928 A2 | 9/2007 |
| WO | 2010128442 | 11/2010 |

OTHER PUBLICATIONS

International Search Report and Written Opinion—PCT/US2011/059613—ISA/EPO—Feb. 2, 2012.

* cited by examiner

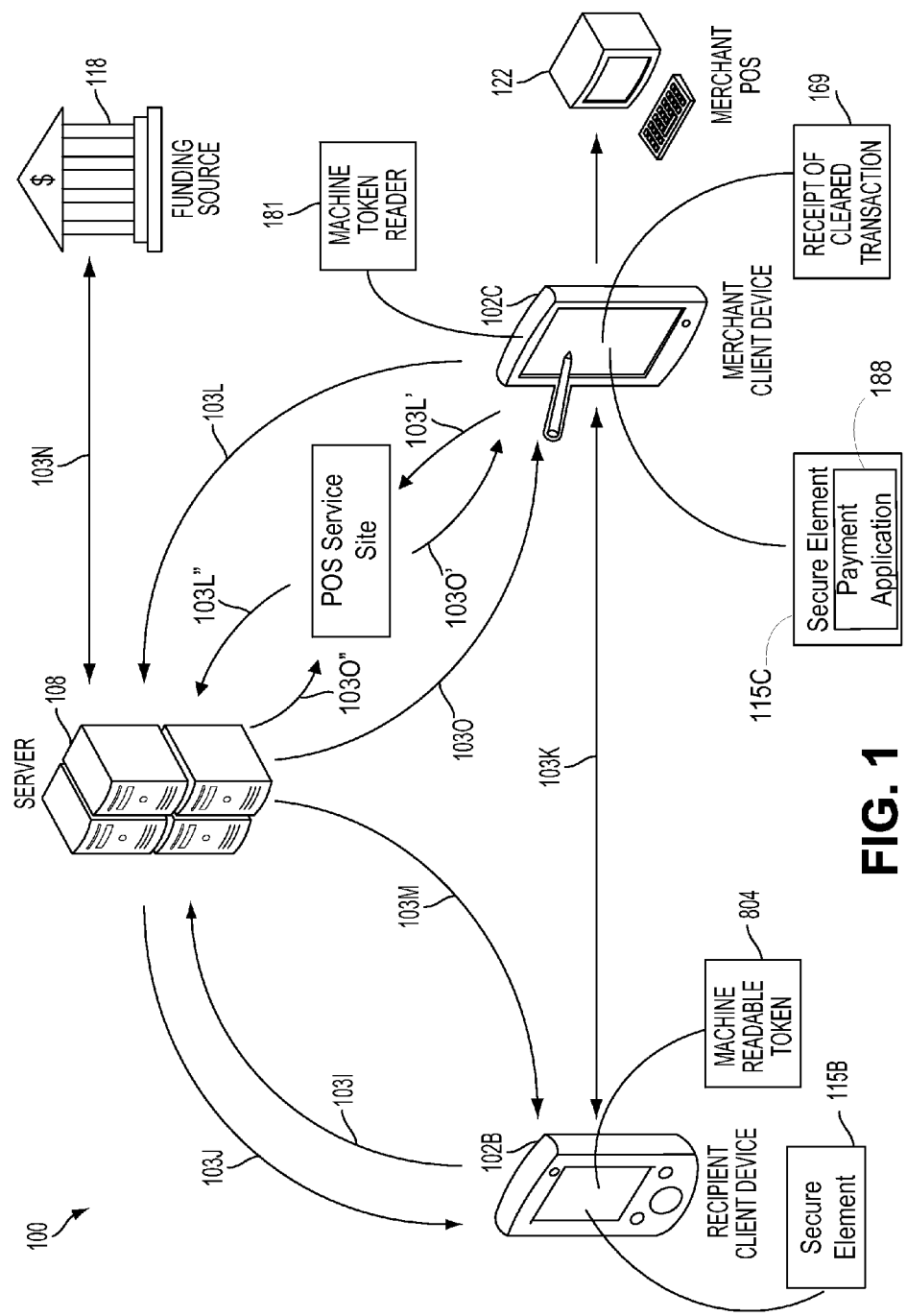

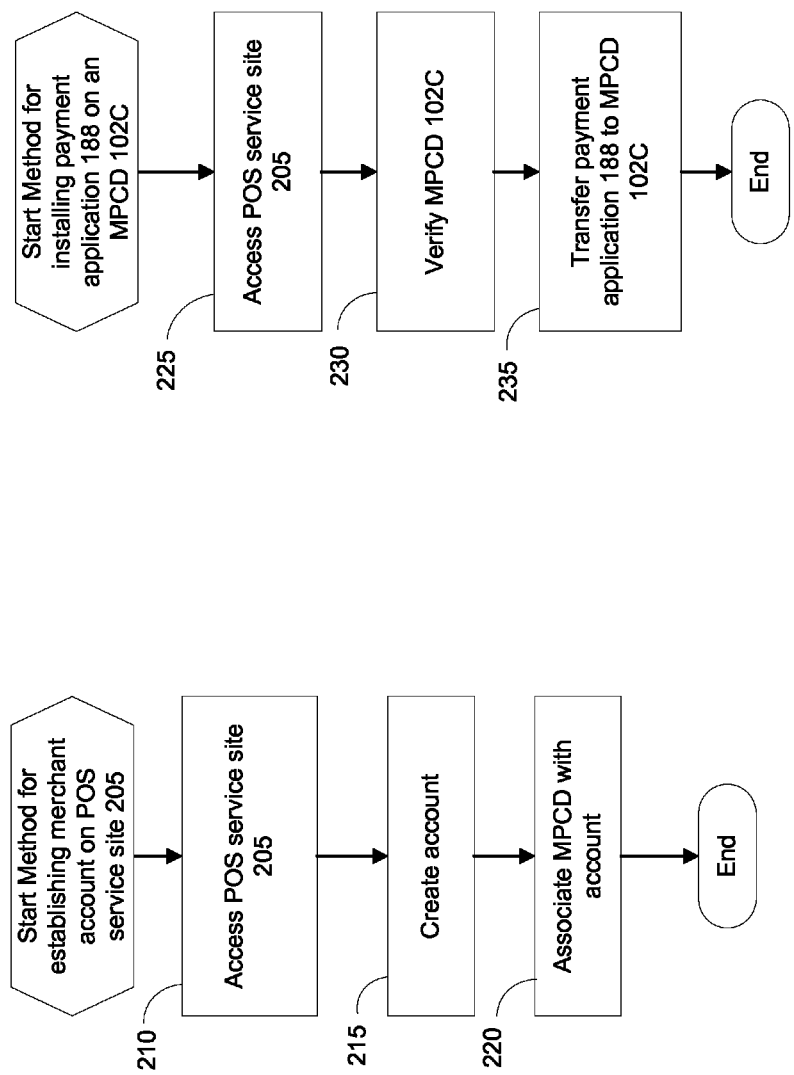

SYSTEM AND METHOD FOR POINT OF SERVICE PAYMENT ACCEPTANCE VIA WIRELESS COMMUNICATION

PRIORITY AND RELATED APPLICATIONS STATEMENT

This application claims priority under 35 U.S.C. §119(e) to U.S. Provisional patent application filed on Dec. 13, 2010, assigned Provisional Application Ser. No. 61/422,606, entitled, "System and method for point of service payment via presentment of a stored value account token;" U.S. Provisional patent application filed on Jan. 31, 2011, assigned Provisional Application Ser. No. 61/438,164, entitled, "System and method for point of service payment acceptance via wireless communication;" and Provisional patent application filed on Mar. 21, 2011, assigned Provisional Application Ser. No. 61/454,721, entitled, "System and method for point of service payment acceptance via wireless communication." The entire contents of these three provisional patent applications are hereby incorporated by reference.

DESCRIPTION OF THE RELATED ART

In today's marketplace, consideration for goods and services is often remitted in forms other than cash. Credit and debit card transactions, as well as gift card and coupon redemptions, are common methods of payment for today's consumers. In response, many merchants and service providers have leveraged such consumer payment behavior by accepting physical or "plastic" payment tokens, such as credit and debit cards, or implementing prepaid gift card or coupon programs.

A merchant seeking to attract consumers by accepting credit card, debit card and/or prepaid gift card transactions must invest in the necessary technology for accommodation of noncash payments by their customers. The customer payment tokens may be associated with a credit account or a stored value account. In order for a merchant to debit the associated account, the payment token must be "swiped" or otherwise charged in a "card not present" transaction.

Accommodation of payment tokens, in lieu of simply accepting cash payments for goods and services, may be a cumbersome endeavor for many merchants. Often, the merchant or service provider must actually generate and send target consumers physical tokens corresponding to unique, stored value accounts—a program that may be unwieldy and expensive to implement for many merchants and service providers. Further, existing point-of-sale ("POS") and accounting systems used by merchants and service providers are often not configured to efficiently handle payment by tokens associated with stored value accounts, including newly developed stored value accounts such as new gift card programs. Moreover, migration of legacy POS and accounting systems to accommodate either the machine-readable codes of tangible payment tokens or wireless transfer of virtual tokens from consumer devices for stored value accounts, may be expensive in terms of necessary infrastructure/hardware as well as cumbersome in terms of continually updating software.

Using a physical payment token, such as a credit card or gift card, is not always the most convenient or secure method of payment for a consumer either. For instance, a consumer with a plurality of payment token accounts may be burdened with managing or carrying an equivalent amount of physical tokens on his or her person. Additionally, in some scenarios, such as a consumer seeking to pay for a meal with a credit card, a consumer must trust that his credit card information will not be stolen by an opportunistic waiter taking the card around the corner to a hidden POS terminal.

Accordingly, what is needed is a system and method that may overcome the problems associated with payment for goods and services through conventional POS system terminals, while at the same time still allowing a merchant to accommodate customers that prefer to pay using physical tokens. More specifically, a system and method is needed for allowing the use of physical tokens for various types of transactions, while also allowing the use of non-physical, or virtual tokens, such that a merchant or service provider may accept payment from any of a consumer's stored value or credit account without adapting existing POS and accounting hardware or software to accommodate for virtual tokens or newly created account programs, such as new stored value accounts.

SUMMARY OF THE DISCLOSURE

A method and system for transferring funds from a first account to a second account in order to remit payment for goods or services are described. The method includes optionally receiving a request for a virtual token at a server from a first portable computing device. The virtual token represents data associated with a first account. The server optionally prepares a virtual token and then transmits the virtual token to the first portable computing device. The first portable computing device optionally receives the virtual token. The first portable computing device also renders the virtual token, such as on a display device of the portable computing device. A second portable computing device captures the presented virtual token and transmits information derived from the virtual token to a server. The server receives this information from the second portable computing device and verifies the transaction. Once verified, the server authorizes a transfer of funds from the first account to a second account, wherein the funds are associated with the virtual token. The second account is associated with the second portable computing device. The first portable computing device may communicate with the same server as the second portable computing device, or the portable computing devices may communicate with different servers. If the portable computing devices communicate with different servers then the servers will eventually share transaction information either directly or through one or more intermediary systems.

Methods and systems to remit payment for goods and services from a customer to a merchant using a merchant portable computing device ("MPCD") are described. The method includes a merchant optionally creating one or more merchant accounts on a point-of-sale service site. The point-of-sale service site provides a payment module to one or more MPCDs used by the merchant. One or more of the MPCDs may be associated with one or more of the merchant accounts on the point-of-sale service site. Additionally, each of the one or more MPCDs may optionally include a secure element where the payment module resides once received at the MPCD. The MPCD running the payment module may receive customer data via near field communication (NFC), where the customer data is associated with a customer payment account. The payment module uses the customer data to accept payment for the merchant, and the MPCD transmits information about the payment transaction, including at least part of the customer data, over a computer network.

BRIEF DESCRIPTION OF THE DRAWINGS

In the Figures, like reference numerals refer to like parts throughout the various views unless otherwise indicated. For reference numerals with letter character designations such as "102A" or "102B", the letter character designations may differentiate two like parts or elements present in the same figure. Letter character designations for reference numerals may be omitted when it is intended that a reference numeral to encompass all parts having the same reference numeral in all figures.

FIG. 1 is a high level diagram illustrating exemplary components of a system for presenting a virtual token associated with a stored value or credit account in payment for goods or services tendered by a merchant;

FIGS. 3A-3B illustrate exemplary methods for a merchant to create an account to allow merchant portable computing devices to receive the payment application needed for the merchant portable computing devices to accept payment on behalf of the merchant;

DETAILED DESCRIPTION

Figure 2A:
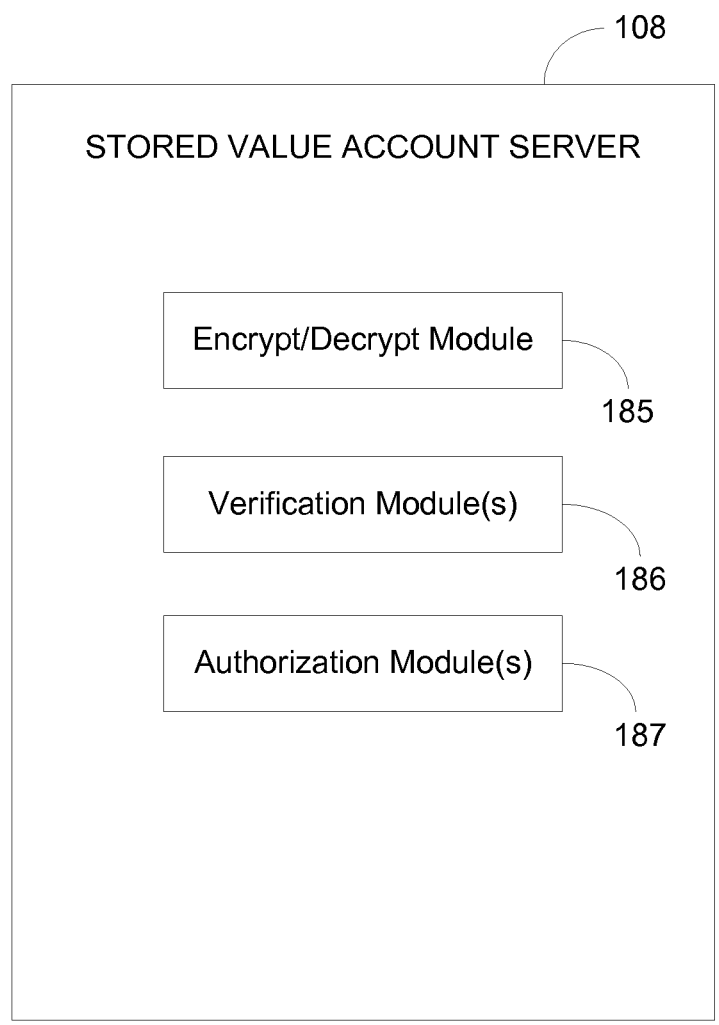
FIG. 2A is a diagram illustrating exemplary stored value account server components for supporting a consumer account that may be accessed from a consumer portable computing device and/or a merchant portable computing device.

The word "exemplary" is used herein to mean "serving as an example, instance, or illustration." Any aspect described herein as "exemplary" is not necessarily to be construed as preferred or advantageous over other aspects.

In this description, the term "application" may also include files having executable content, such as: object code, scripts, byte code, markup language files, and patches. In addition, an "application" referred to herein, may also include files that are not executable in nature, such as documents that may need to be opened or other data files that need to be accessed.

The term "content" may also include files having executable content, such as: object code, scripts, byte code, markup language files, and patches. In addition, "content" referred to herein, may also include files that are not executable in nature, such as documents that may need to be opened or other data files that need to be accessed.

As used in this description, the terms "component," "database," "module," "system," "element," and the like are intended to refer to a computer-related entity, either hardware, firmware, a combination of hardware and software, software, or software in execution. For example, an element may be, but is not limited to being, a process running on a processor, a processor, an object, an executable, a thread of execution, a program, and/or a computer. By way of illustration, both an application running on a computing device and the computing device may be an element.

Similarly, one or more elements may reside within a process and/or thread of execution, and a component may be localized on one computer and/or distributed between two or more computers. In addition, these elements may execute from various computer readable media having various data structures stored thereon. The elements may communicate by way of local and/or remote processes such as in accordance with a signal having one or more data packets (e.g., data from one component interacting with another element or component in a local system, distributed system, and/or across a network such as the Internet with other systems by way of the signal).

In this description, the terms "communication device," "wireless device," "wireless telephone," "wireless communication device," and "wireless handset" are used interchangeably. With the advent of third generation ("3G") and fourth generation ("4G") wireless technology, greater bandwidth availability has enabled more portable computing devices with a greater variety of wireless capabilities. Therefore, a portable computing device ("PCD") may include a cellular telephone, a pager, a PDA, a smartphone, a navigation device, a tablet personal computer ("PC"), or a hand-held computer with a wireless connection or link.

Referring to FIG. 1, this figure is a diagram of a first aspect of a system 100 for presenting payment to a merchant in payment for goods and services. Advantageously, payment is presented to a merchant client device 102C via the exemplary system embodiment of FIG. 1, or other envisioned embodiments. Payment may be accepted by a merchant for goods or services by a wide variety of consumer payment methods without the merchant having to migrate, upgrade, retrofit or otherwise adapt an existing POS and accounting system 122. Importantly, although various embodiments of the system and method are described herein relative to applications wherein it may be advantageous to mitigate, avoid or otherwise eliminate the necessity for integration with a POS and/or backend accounting system, it will be understood that a POS system is not a required element in all embodiments. As such, the presence or absence of a POS system and/or backend accounting system component in a given embodiment will not be a limiting factor on the scope of the disclosure.

In the exemplary system 100 illustrated in FIG. 1, a consumer is tendering payment via a recipient client portable computing device 102B using a virtual machine-readable token 804. The virtual machine-readable token 804 is associated with a stored value or credit account as will be discussed more fully below. In other embodiments of system 100, the consumer may tender payment through other methods or means that can be presented to the merchant client device 102C, including, but not limited to, integrated circuit cards or "chip cards" such as EUROPAY™, MASTER-CARD™ and VISA™ ("EMV") cards, IC Credit cards, Chip and Pin cards, or the like (collectively referred to herein as "EMV cards").

In FIG. 1, a merchant's existing POS and backend accounting system 122 ("POS system") may be of any type known to one of ordinary skill in the art such as, for example, a typical "hub and spoke" POS system 122 commonly found in dining establishments where one or more POS terminals interface to a central accounting system. Briefly, and to provide the basis for an exemplary, non-limiting application scenario in which aspects of some embodiments of the disclosed systems and methods may be suitably described, consider a typical restaurant experience.

As is known to one of ordinary skill in the art of restaurant POS systems, a waitperson may track at a POS terminal the food and beverage consumption associated with a particular table of patrons. After the dining experience, the POS terminal may generate a "tab" or "bill" to be presented to the patrons by the waitperson. To pay the bill, the patrons may provide the waitperson with any number of accepted forms of payment including, but not limited to, cash, a tangible credit card associated with a credit account, a tangible gift card associated with a stored value account and, in some cases, a virtual machine-readable token 804 representative of a tangible credit or gift card presented on a display of a customer portable computing device 102B.

As an aside, a gift card may be of a type that is uniquely accepted by the given merchant, i.e. a "closed loop" gift card, or a type that is practically universally accepted among merchants, i.e. an "open loop" gift card. Aspects of embodiments envisioned for accommodation of closed loop and/or open loop gift cards will be discussed in more detail in connection with FIG. 7A.

In many cases, the form of payment tendered by the patron must be accommodated by the POS system 122, as the waitperson must use the payment form to reconcile and close the patron's tab. Tokens such as credit cards or gift cards may be physically scanned by the POS system 122 or, alternatively, their associated account data otherwise entered into the system by the waitperson. Once the payment is "cleared" in the POS system 122 such that a merchant account has been credited at the expense of a debit to the consumer account associated with the token tendered by the patron, a receipt documenting the transaction may be generated.

Turning back to the FIG. 1 illustration, it is an advantage of embodiments of the system 100 that a patron, such as the exemplary restaurant patron, may present payment in the form of an EMV card or virtual, machine-readable token to a merchant client device 102C, wherein the merchant POS system 122 advantageously does not have to be configured to interface with the virtual, machine-readable token presentment. It is an additional advantage of embodiments of the system 100 that the merchant client device 102C may operate independently of a merchant POS system 112 if desired, or without the need for any merchant POS system 122 at all.

More specifically, embodiments may allow a merchant to use one or more merchant client devices 102C as mobile POS devices without need for infrastructure/hardware of a separate traditional POS system 122.

As illustrated in FIG. 1, an exemplary recipient client portable computing device 102B, which is associated with a stored value or credit account, may be used by a consumer to pay for goods and services via presentment of a virtual machine-readable token 804. The virtual machine-readable token 804 may contain data representative of the consumer's account. Notably, the recipient client portable computing device 102B may also be referred to in the present disclosure as a client portable computing device or a consumer portable computing device ("CPCD") 102B.

The CPCD 102B may be configured to execute a software application that requests over communication link 103I and receives over communication link 103J a virtual machine-readable token 804 from a stored value account server 108 of system 100. In some exemplary embodiments, the virtual machine-readable token 804 requested from the stored value account server 108 will be generated and encrypted for secure transmission to the requesting device 102B.

Further, in some embodiments, it is envisioned that the virtual machine-readable token 804 may be generated at a prior time or date and stored on the CPCD 102B itself in secure element 115B until the customer desires to used the CPCD to pay for some product or service. In such embodiments, it may not be necessary for the CPCD 102B to communicate with a stored value account server 108, or its equivalent, at the time of purchase. Instead, for these embodiments, the CPCD 102B may use the virtual machine-readable token 804 stored in the secure element 115B to tender payment.

The stored value account server 108 of FIG. 1 is intended to be a general representation of a system platform that may be in communication with the merchant portable computing device ("MPCD") 102C, a funding source 118, and, in some embodiments, the recipient portable computing device 102B. Disclosure of various features and aspects of the stored value account server 108 will be described below in connection with FIGS. 7-8. Further, the term "stored value account server" 108 will not be construed such that a system platform comprising a stored value account server component is limited to only providing virtual token solutions in connection with stored value accounts only. Rather, it is envisioned that other account types such as, but not limited to, credit accounts may be associated with virtual token solutions managed by the CPCD 102B and the server 108. Similarly, it is envisioned that the "stored value account server" may also provide a platform for physical tokens able to communicate with the MPCD 102C, such as EMV cards, which may also be associated with stored valued accounts, credit accounts, etc.

Further, despite the FIG. 1 illustration of a single server bank as representative of stored value account server 108, it will be understood by one of ordinary skill in the art that the various functions and aspects described herein in connection with server 108, as well as the various other components comprised within various embodiments of system 100, may be implemented across a plurality of components residing on common system platforms, complimentary system platforms and/or geographically dispersed platforms. Additionally, although some embodiments of the systems and methods described herein envision that a given CPCD 102B may communicate with a single, common server or server bank 108 configured to also communicate with a given MPCD 102C, it is also envisioned that some embodiments will leverage two or more servers 108, or combinations of servers 108, to separately support communication with a given CPCD 102B and a given MPCD 102C. In such embodiments, the separate servers 108 respectively configured for support of, and communication with, a given CPCD 102B and a given MPCD 102C may also be communicatively coupled to each other through any combination of wireless and wired links including, but not limited to, any combination of radio-frequency ("RF") links, infrared links, acoustic links, other wireless mediums, wide area networks ("WAN"), local area networks ("LAN"), the Internet, a Public Switched Telephony Network ("PSTN"), and a paging network.

To tender payment for goods or services, a consumer may leverage a software application executed on the CPCD 102B to render a virtual machine-readable token 804 that was received over communication link 103J from stored value account server 108. A system platform, such as the server 108, may receive a request from a CPCD 102B for generating the virtual machine-readable token 804. The request may comprise a request for a virtual machine-readable token 804 containing certain account data. However, it is envisioned that a request for a virtual machine-readable token 804 may further include, but is not limited to, a predetermined fund amount to be associated with the virtual machine-readable token 804 (e.g., the amount to be paid to a merchant—such as a bill total plus tip percentage), alternative funding source data, etc.

The virtual machine-readable token 804 may be received over communication link 103J at the time of the transaction, or may alternatively have been received over communication link 103J at a previous time and date and stored on the CPCD 102B until the time of the transaction. In an exemplary embodiment, a previously-received virtual machine-readable token 804 will be stored in a secure element 115B on the CPCD 102B.

Some virtual machine-readable tokens 804 will be rendered in an encrypted format. Generally, the virtual machine-readable token 804 may be rendered in a non-visual format by magnetic fields; however, other wireless methods, such sound waves, light waves, radio-frequency communications, etc. may be used. In other embodiments, the virtual machine-readable token 804 may also be presented on the display of the CPCD 102B in the form of a picture of a tangible token (e.g., a credit card) along with an encrypted form of a machine-readable code, such as a bar code or the like. In some exemplary embodiments, all techniques or various combinations of the machine-readable tokens 804 and wireless methods may be supported by individual CPCDs 102B and MPCDs 102C.

Alternatively, to tender payment for goods or services, a consumer may present a physical token such as an EMV card able to communicate with the MPCD 102C via magnetic fields, or other wireless manner, including sound waves, light waves, radio-frequency communications, etc.

Regardless of the payment or presentment method, the virtual machine-readable token 804 or EMV card will contain data that is representative of a stored value account or credit account associated with the consumer seeking to pay for goods or services. The merchant portable computing device ("MPCD") 102C will be configured to receive communications from the CPCD 102B, or physical token such as an EMV card, via communications link 103K in order to accept payment. According to one exemplary embodiment, communications link 103K may comprise an NFC link activated when the CPCD 102B, or an EMV card, is brought in close proximity with, or touched to, the MPCD 102C. Although, as discussed above, other types of signals including visual (i.e. visual capture of a 2-D bar code) and non-visual presentations may also be used for communications link 103K.

The merchant portable computing device ("MPCD") 102C may be configured to execute a software application that is complimentary to the aforementioned software application running on the CPCD 102B. In the illustrated exemplary embodiment, and as discussed below, the virtual machine-readable token 804 or EMV card information is received from the communication link 103K at the MPCD 102C by a machine token reader 181. Once the virtual machine-readable token 804 or EMV card information is received, the MPCD 102C may extract data from the token 804 or EMV card information using a payment application 188 residing in a secure element 115C of the MPCD 102C. As discussed below with respect to FIGS. 3A-3B and 4A-4B, the payment application 188 is provided by a POS service site 205 and configured to allow each MPCD 102C to process transactions based on information received from a customer's EMV card or CPCD 102C.

After processing the transaction with the payment application 188, the MPCD 102C may transmit the data extracted from the EMV card or virtual machine-readable token 804 (i.e.—consumer account identifying information), along with other transaction data over communication link 103L back to stored value account server 108. In some embodiments, the MPCD 102C may communicate directly with stored value account server 108 over communication link 103L. In other embodiments, the MPCD 102C may communicate with stored value account server 108 through the POS service site 205 over communication links 103L' and 103L" as will be discussed more fully below.

Upon receiving the extracted data and/or transaction data from the MPCD 102C (which in the case of payment by a CPCD 102B also comprises the same data which was earlier generated and transmitted at the request of CPCD 102B), the stored value account server 108 may verify over communication link 103M that CPCD 102B remains in a presentment mode for conveying the virtual machine-readable token 804. Advantageously, one of ordinary skill in the art will understand that by verifying that CPCD 102B remains in a presentment mode for conveying the virtual token 804, the transaction may be authenticated by the server 108. It is further envisioned that transactional security may be accomplished in some embodiments by other methods such as by time stamping the virtual token 804 or using other methods to ensure that the virtual token 804 is valid and that the consumer intends for a funding transfer to take place using his or her CPCD 102B.

After verification and authentication of the requested transaction, funds in the amount originally requested over communication link 103I for presentment by CPCD 102B may be transferred over communication link 103N from a stored value account or credit account associated with the CPCD 102B to a merchant account 118. As understood by one of ordinary skill in the art, it is envisioned that some embodiments may accomplish the transfer of monies from a consumer's associated account to a merchant account via an electronic funds transfer methodology (e.g., automatic clearing house—ACH).

Notably, although the funding source 118 is illustrated in FIG. 1 to represent an institution for storing a merchant account (and the final destination of funds transferred from a consumer's stored value account as a result of a virtual token presentment), it is envisioned that some embodiments of the disclosed system and method 100 may include the consumer's stored value account or credit account at the funding source 118.

After payment has been successfully remitted to the merchant account in funding source 118, a confirmation or transaction receipt 169 may be transmitted over communication link 103O back to MPCD 102C. Additionally, it is envisioned that in some embodiments the CPCD 102B may also receive electronic verification in the form of a receipt that the funds have been successfully transferred to the merchant account. The communication from the stored value account server 108 to the MPCD 102C may be direct, using communication link 103O, or may be through POS service site 205, using communication links 103O' and 103O" as discussed below.

Although the illustrated embodiment in FIG. 1 only shows one MPCD 102C, it is anticipated that multiple MPCDs 102C may be associated with, and accept payments for, a merchant, or a merchant POS system 112. Aspects of the system 100 allow a merchant to manage multiple MPCDs 102C as understood by one of ordinary skill in the art.

Figure 2B:
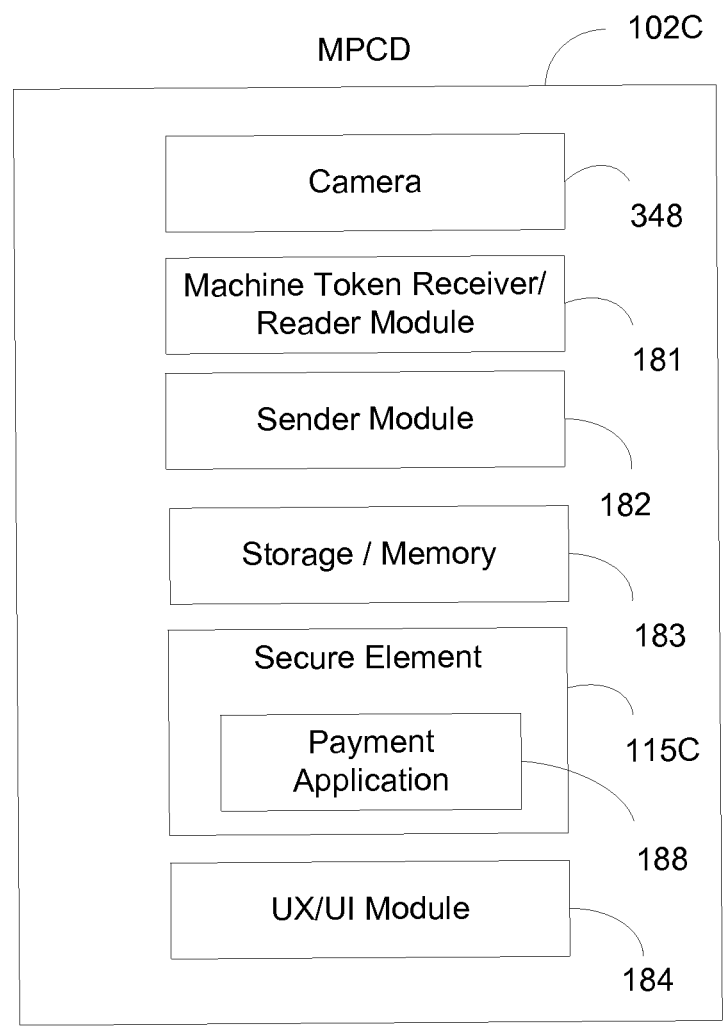
FIG. 2B is a functional block diagram illustrating an exemplary aspects of a merchant portable computing device that may be included in the system illustrated in FIG. 1.

FIGS. 2A-2B are functional block diagrams illustrating aspects of the exemplary stored value account server 108 and exemplary computing devices 102 of FIG. 1. Referring to FIG. 2A, exemplary stored value account server 108 components may comprise modules 185 configured to encrypt and decrypt virtual token data associated with a consumer account. Similarly, verification modules 186 and authorization modules 187 may be included in some stored value account servers 108. The verification modules 186 and authorization modules 187 may help confirm that a CPCD 102B is in an active presentment mode or determine that consumer credit is authorized.

Referring to FIG. 2B, an exemplary MPCD 102C may comprise a camera 348 and a receiver/machine token reader module 181 for receiving information from an EMV card or the virtual machine-readable token generated by the client or consumer portable computing device 102B as illustrated in FIG. 1. The receiver/machine token reader module 181 may be configured to receive or capture EMV card information or virtual machine-readable tokens 804 presented to the MPCD 102C in any number of formats. Thus, the receiver/machine token reader module 181 may comprise an NFC transceiver, a radio transceiver, a photodiode arrangement, an acoustic receiver, etc.

Further, the exemplary MPCD 102C may also comprise a sender module 182 for sending received or captured to virtual machine-readable tokens 804 to the server 108. It is envisioned that a sender module 182 may be configured to transmit data, such as a captured virtual machine-readable token 804, data extracted from the token 804, or data extracted from an EMV card by way of wired or wireless links 103 to the server 108. Wireless and wired links 103 include, but are not limited to, any combination of radio-frequency ("RF") links, infrared links, acoustic links, other wireless mediums, wide area networks ("WAN"), local area networks ("LAN"), the Internet, a Public Switched Telephony Network ("PSTN"), and a paging network.

An exemplary MPCD 102C may also comprise a computer readable storage/memory component 183 for storing, whether temporarily or permanently, various data including, but not limited to, the virtual machine-readable token 804 as well as data extracted or derived from the token 804 or an EMV card. Data extracted from the virtual machine-readable token 804 or an EMV card may comprise a user ID, a transaction ID, universal product codes (UPCs), a merchant ID, account numbers and other account related data, etc.

The exemplary MPCD 102C illustrated in FIG. 2 may also comprise a secure element 115C for storing the payment application 188. As discussed below with respect to FIGS. 3A-3B and 4A-4B, the payment application 188 processes the payment transaction and allows the MPCD 102C to accept payments for the merchant. As illustrated in FIG. 2, the secure element 115C may be separate from the Storage/Memory 183, such in as a separate secure memory area or embedded in hardware on the MPCD 102C (such as in a SIM card). Alternatively, the secure element 115C may be part of the Storage/Memory 183, such as a secure partition of the Storage/Memory 183. Additionally, the secure element 115C of the MPCD 102C may also contain various digital or electronic keys or security codes that may be needed to allow the MPCD 102C to accept various forms of payment from customers and/or to transfer payments accepted from customers into an appropriate account associated with the merchant.

The exemplary MPCD 102C may also optionally include a user experience/user interface ("UX/UI") module 184. The UX/UI module 184 may be responsible for manual entry of token data, the rendering of data to a user, and the actuation of various system or component functions by a device user, etc. For example, in some embodiments, the MPCD 102C may automatically determine the method of payment being offered by the customer based on the type of data that the MPCD 102C detects coming from the customer, such as a virtual machine-readable token 804 transmitted via near field communication (NFC) from the CPCD 102B as shown in FIG. 1. In other embodiments, a user of the MPCD 102C may engage the UX/UI module 184 to allow the MPCD 102C to receive payment from the customer, or to put the MPCD 102C into the correct mode for receiving the method of payment being offered by the customer.

While FIG. 2B shows an exemplary embodiment for the MPCD 102C, it is envisioned that the MPCD 102C may have more or fewer components and still be within the scope of the system 100. Additionally, FIGS. 1 and 2 only show a single MPCD 102C; however, it is envisioned that a single merchant may implement multiple MPCDs 102C. In such an embodiment, each of the various MPCDs 102C may be arranged as shown for the exemplary MPCD 102C of FIG. 2. Alternatively, they may be arranged differently or they may contain fewer or more components, or any combination thereof.

Referring now to FIGS. 3A-3B, these figures illustrate an exemplary method for a merchant to create an account in order to obtain the payment application 188 needed for MPCDs 102C to accept payment for the merchant. As described relative to FIG. 1 and subsequent figures, a merchant portable computing device such as MPCD 102C may be configured to request, receive and capture data from a customer, such as from an EMV card or a virtual machine-readable token 804 on a CPCD 102B. The MPCD 102C may leverage the data received to accept payment from the customer for goods and/or services provided by the merchant.

Beginning at step 210 of FIG. 3A, a merchant accesses a Point-of-Sale Service Site ("POS service site") 205. In the illustrated embodiment of FIG. 3A and subsequent figures, the POS Service site 205 is an application server located remotely from the merchant that hosts a website for downloading software to MPCDs 102C. In other embodiments, the POS service site 205 may be co-located with the merchant, or may be co-located with other elements of the system 100. In the exemplary embodiment, the merchant connects to the POS service site 205 using a browser operated by a merchant computer. The merchant computer may be the merchant POS system 122, a device that the merchant anticipates using as an MPCD 102C or any other computer owned or operated by the merchant.

Similarly, although a browser is used to access the POS service site 205 in the exemplary embodiment, it is envisioned that a merchant may contact the POS service site 205 by way of any wired or wireless links 103. Wireless and wired links 103 include, but are not limited to, any combination of radio-frequency ("RF") links, infrared links, acoustic links, other wireless mediums, wide area networks ("WAN"), local area networks ("LAN"), the Internet, a Public Switched Telephony Network ("PSTN"), and a paging network.

Once the merchant has accessed the POS service site 205, the merchant creates an account in accordance with step 215. The merchant creates an account on the POS service site 205 in an exemplary embodiment by creating a username for the account and a password for the account. Additionally, the merchant may provide other information when creating the account such as information needed to link the account at the POS service site 205 with one or more of the merchant's financial accounts, such as a bank account at the merchant's Funding Source 118. In some embodiments, the merchant may also provide additional information when creating the account at the POS service site 205, such as information relating to the merchant's own POS system 122, if any, to allow the MPCDs to be used as part of the merchant's POS system 122. Similarly, as part of creating the account, the merchant may set or activate various security measures to limit access to the merchant's account and/or prevent unauthorized access.

After creating an account at the POS service site 205 at step 215, the merchant then associates one or more MPCDs 102C with his account at step 220 to allow the MPCDs 102C to receive the payment application 188 (see FIG. 3B) and subsequently receive payments from customers. To associate an MPCD 102C with his account on the POS service site 205, the merchant provides information specific to an MPCD 102C, such as an International Mobile Equipment Identity ("IMEI"), telephone number, etc. In this manner, each MPCD 102C becomes associated or registered with an account on the POS service site 205. Although the discussion herein has described the steps of FIG. 3A as occurring in one communication between the merchant and the POS service site 205, such as one Internet session, it is envisioned that the steps may be performed through any number of separate communications if desired.

Additionally, in the exemplary embodiment illustrated in FIG. 3A, the merchant may create one account at the POS service site 205 and associate all of the merchant's MPCDs 102C with that account. In other embodiments, the merchant may create multiple accounts at the POS service site 205 to allow the merchant to create groupings of MPCDs 102C associated with each account. The multiple accounts on the POS service site 205 may be sub-accounts under a master account, or may be separate accounts independent of each other.

Similarly, one or more of the accounts that the merchant creates on the POS service site 205 may be linked with one or more of the merchant's financial accounts, such as bank accounts, stored value accounts, credit accounts, etc. In other words, the merchant may create one account on the POS service site 205 that is linked to the merchant's checking account at one bank, a second account on the POS service site 205 that is linked to a checking account at a second bank, and a third account on the POS service site 205 that is linked to a credit account at the first bank, or any other combination desired.

Similarly, each MPCD 102C may be associated with more than one of the accounts that the merchant sets up on the POS service site 205 if desired. Using the above example, the merchant may create a first group of MPCDs 102C associated with the first account on the POS service site 205 that is linked to the merchant's checking account at the first bank; a second group of MPCDs 102C associated with the second account on the POS service site 205 that is linked to the checking account at the second bank; and both the first and second groups of MPCDs 102C may also be associated with the third account on the POS service site 205 that is linked to the credit account at the first bank, or any other combination desired.

Turning now to FIG. 3B, an exemplary method is illustrated for installing the payment application 188 on the merchant's MPCDs 102C to allow the MPCDs 102C to accept payment for the merchant. As demonstrated in FIG. 3B, at any time after the merchant has created the account on the POS service site 205, the MPCD 102C connects to the POS service site 205 in step 225. In the exemplary embodiment, the MPCD 102C connects to the POS service site 205 using a browser on the MPCD 102C. However, the MPCD 102C may contact the POS service site 205 by way of any wired or wireless links 103 sufficient to allow the transfer of data. Additionally, as part of connecting to the POS service site 205 and/or accessing the desired account(s), the user or operator of the MPCD 102C may be required to enter the merchant's account information and password, a security code, or respond to any other security measures that the merchant may have established when creating the account at step 205 of FIG. 3A.

Once the MPCD 102C has connected to the POS service site 205, the POS service site 205 verifies the MPCD 102C in accordance with step 230. Such verification may include comparing the telephone number and/or IMEI of the MPCD 102C with a table, listing, or database of telephone numbers or IMEIs associated with active accounts on the POS service site 205. Additionally, such verification may include the POS service site 205 requiring the MPCD 102C to enter an account identifier and/or password for a merchant account on the POS service site 205 with which the MPCD 102C is associated. Such verification may include the POS service site 205 requiring the merchant to verify the identity of the MPCD 102C via a separate communication, or any other method or means by which the POS service site 205 may ensure that the MPCD 102C is associated with a merchant account.

After the MPCD 102C is verified in step 230, the POS service site 205 installs the payment application 188 on the MPCD 102C in step 235, such as by downloading code to the MPCD 102C though the MPCD's browser. In the exemplary embodiment shown in the subsequent figures, the payment application 188 is installed in the secure element 115 of the MPCD 102C.

Figure 4B:
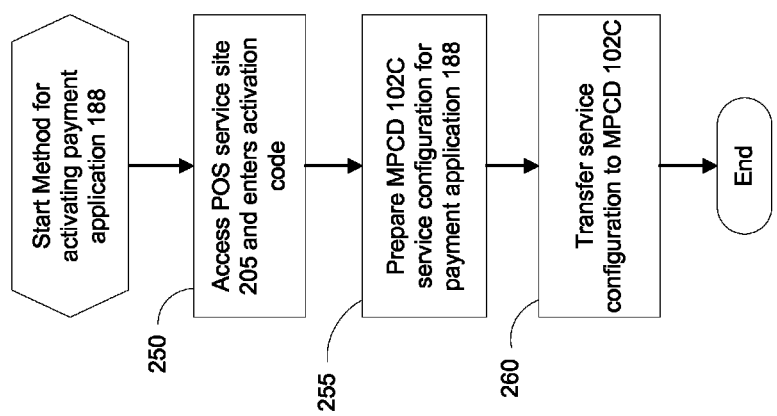
FIGS. 4A-4B illustrate exemplary methods for a merchant to manage his account and activate the payment application on the merchant portable computing devices.
Figure 4A:
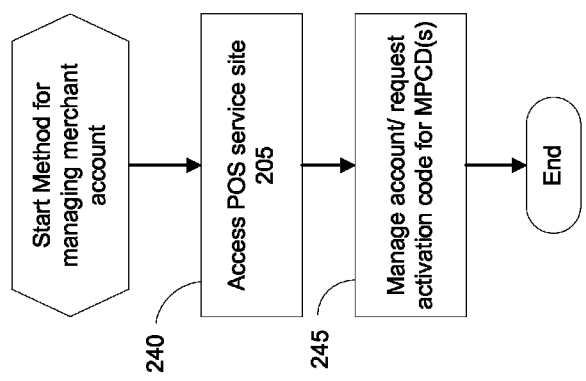

Referring now to FIGS. 4A-4B, these figures illustrate an exemplary method for a merchant to manage his account and/or activate the payment application 188 installed on one or more merchant MPCDs 102C. At step 240, the merchant accesses the POS service site 205. In the exemplary embodiment, the merchant accesses the POS service site 205 using a browser operated by a merchant computer. The merchant computer may be the merchant POS system 122, a device that the merchant anticipates using as an MPCD 102C or any other computer owned or operated by the merchant. Similarly, although a browser is used to connect to the Point-of-Sale Service Site ("POS service site") 205 in the exemplary embodiment, it is envisioned that a merchant may contact the POS service site 205 by way of any wired or wireless links 103. As part of accessing the POS service site 205, the merchant may be required to enter his account information and password, a security code, or respond to any other security measures that the merchant may have established when creating his account in accordance with step 205 of FIG. 3A.

Once the merchant has accessed the POS service site 205, the merchant may take any action desired to manage his account in accordance with step 245. For example, the merchant may add accounts or sub-accounts, may alter, edit, or re-arrange existing accounts or sub-accounts in any fashion desired, may add, edit, or re-arrange individual MPCDs 102C or groupings of MPCDs 102C as desired, may add new MPCDs 102C, may remove MPCDs 102C from his account(s) as in the case of a lost or broken MPCD 102C, etc. Additionally, the merchant may activate any MPCDs 102C that have not previously been activated.

In the embodiment illustrated in FIG. 4A, one or more MPCDs 102C are activated by requesting an activation code from the POS service site 205 which then provides the code(s) to the merchant. However, any suitable method or means of activating the MPCDs 102C may be used. In the exemplary embodiment, the POS service site 205 provides a unique code for each MPCD 102C that is to be activated.

As illustrated in FIG. 4B in the exemplary embodiment, once the merchant has the activation code(s), an MPCD 102C to be activated connects to the POS service site 205 at step 250 and enters the activation code/provides the activation code to the POS service site 205. In some embodiments, the MPCD 102C may enter the activation code in response to a prompt or message automatically generated once the MPCD 102C is connected to the POS service site 205. In other embodiments, the operator or user of the MPCD 102C may navigate a user interface on the POS service site 205 to find the appropriate location to enter/provide the activation code.

In the exemplary embodiment, the MPCD 102C connects to the POS service site 205 using a browser on the MPCD 102C. However, the MPCD 102C may contact the POS service site 205 by way of any wired or wireless links 103 sufficient to allow the transfer of data. As part of connecting to the POS service site 205 and accessing the desired account(s), the user or operator of the MPCD 102C may be required to enter the merchant's account information and password, a security code, or respond to any other security measures that the merchant may have established when creating the account at step 205 of FIG. 3A. Additionally, if desired, the activation code(s) may expire such that once an activation code for a particular MPCD 102C is provided to the merchant, the MPCD 102C must connect to the POS service site 205 within a set time period or else the activation code for the MPCD 102C is no longer valid/effective to activate the MPCD 102C.

Once the MPCD 102C has connected to the POS service site 205 and provided the appropriate activation code, the POS service site 205 activates the payment application 188 located in the secure element 115 of the MPCD 102C and prepares a service configuration for the payment application 188 in step 255. In the exemplary embodiment, the service configuration for a particular MPCD 102C depends on the merchant account(s) at the POS service site 205 with which the MPCD 102C has been associated.

For example, if the MPCD 102C has been associated with a merchant account allowing customers to pay with EMV cards, any necessary EMV keys will be provided in the service configuration of the payment application 188 located in the secure element 115 of the MPCD 102C. This service configuration comprising the EMV keys is transmitted to the MPCD 102C in step 260.

Similarly, the service configuration may include providing any keys or codes necessary for the MPCD 102C to be able to transfer funds to the merchant financial accounts, such as at the Funding Source 118, that are linked to the applicable POS service site 205 accounts with which the MPCD 102C is associated. In some embodiments, the service configuration may also include providing or setting an alphanumeric sequence in the payment application 188 in the secure element 115 on the MPCD 102C to uniquely identify that MPCD 102C during operation.

In embodiments where encryption by the MPCD 102C may be desired, the service configuration may include activating a security routine or portion of the payment application 188 located in the secure element 115 of the MPCD 102C. Additionally, for such embodiments where encryption by the MPCD 102C is desired, the service configuration may include providing or installing a separate security application, routine and/or code to secure element 115 of the MPCD 102C to implement the desired security protocols, including any codes/keys/etc. needed for encryption or decryption.

Similarly, in embodiments where encryption may be desired, the service configuration may also include a provisioning server (not shown) apart from the POS service site 205 which transmits, provides, or installs the separate security application, routine, and/or code into the secure element 115 of the MPCD 102C, along with any codes/keys/etc. that may be needed for encryption or decryption. Such provisioning server may be remotely located from, or co-located with, the servers on which the POS service site 205 resides.

Figure 5:
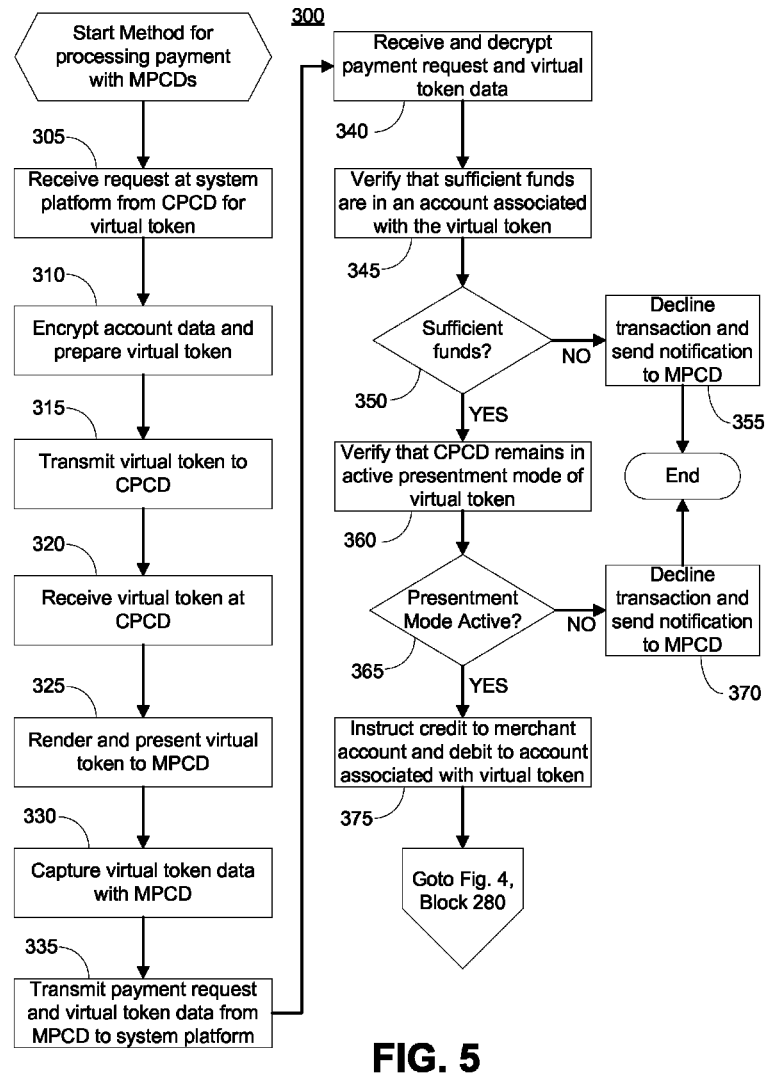
FIGS. 5-6 illustrate exemplary methods for presenting a merchant portable computing device to accept payment for goods or services tendered by a merchant with a noninte-grated POS system, or without any POS system.
Figure 6:
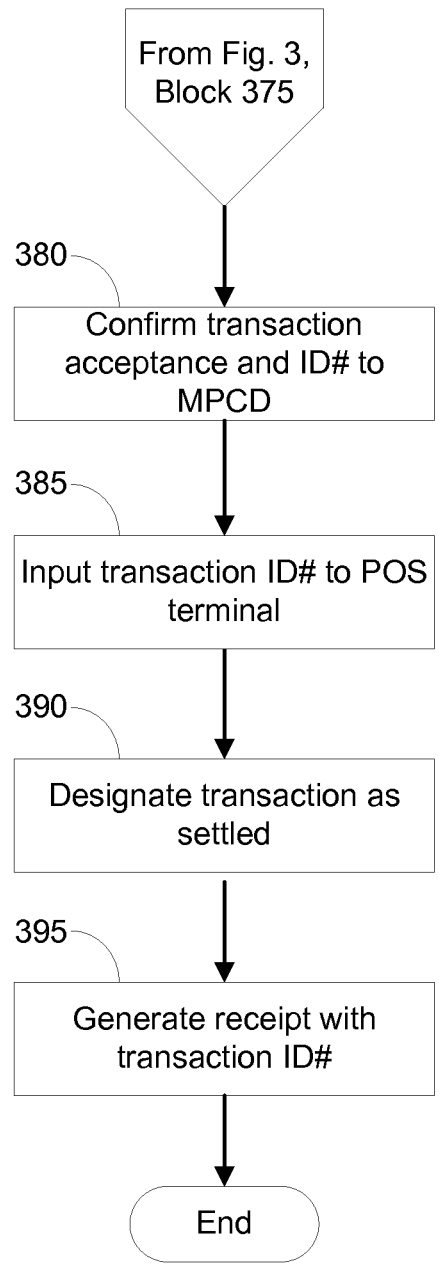

Once the MPCD 102C or group of MPCSs have been activated and have the appropriate service configuration, they are operable to accept payment for the merchant. Turning now to FIGS. 5-6, these figures illustrate an exemplary method for presenting payment of goods or services provided by a merchant having a POS system 122 not configured to interface with a virtual token presentment, or a merchant without any sort of separate POS system 122.

As described relative to FIG. 1 and subsequent figures, a consumer portable computing device such as CPCD 102B may be configured to request, receive, and render a virtual machine-readable token 804 such that a complimentary MPCD 102C may capture the rendered virtual machine-readable token 804 when it is presented. The MPCD 102C may leverage the data embedded in the virtual machine-readable token 804 or the MPCD 102C may capture information data from an appropriate physical tokens such as an EMV card when presented for payment.

According to alternate exemplary embodiments, a merchant using a MPCD 102C may choose to use virtual machine-readable tokens 804 that are only displayed on the CPCD 102B and to not process or handle NFC communications. In such situations, a secure element 115C is not needed and the payment application 188 may be downloaded and exist on the MPCD 102C, such as in storage/memory 183 without having the secure element 115C.

FIG. 5 illustrates an exemplary method 300 for presenting a merchant portable computing device to accept payment for goods or services tendered by a merchant with a nonintegrated POS system, or without any POS system. Beginning at step 305 of FIG. 5, a system platform, such as the server 108, may receive a request from a CPCD 102B for generating a virtual machine-readable token 804. The request may comprise a request for a virtual machine-readable token 804 containing certain account data, however, it is envisioned that a request for a virtual machine-readable token 804 may further include, but is not limited to, a predetermined fund amount to be associated with the virtual machine-readable token 804 (e.g., the amount to be paid to a merchant—such as a bill total plus tip percentage), alternative funding source data, etc.

As described above, the CPCD 102B may be associated with any number of account types including, but not limited to, a stored value account, a credit account, a debit account, etc. The virtual machine-readable token 804 that is representative of an associated account similar to traditional physical tokens.

As the requesting CPCD 102B may be identified via methods known by one of ordinary skill in the art of telecommunications, the server 108 may identify an associated account and encrypt the requested account data by virtue of generating a virtual machine-readable token 804 at step 310. Once the virtual machine-readable token 804 is generated, it may be transmitted at step 315 to the requesting CPCD 102B.

The CPCD 102B receives the virtual machine-readable token 804 at step 320. In step 325, the CPCD 102B renders and presents the virtual machine-readable token 804 to a MPCD 102C for payment as illustrated in FIG. 1. In some embodiments, one or more of the previously-described steps of 305-315 may take place at the time when the CPCD 102B is being used to offer payment to obtain the virtual machine-readable token 804. In other embodiments, one or more of the previously-described steps of 305-315 may take place prior to the time or date on which the CPCD 102B is being used to offer payment, in which case, the previously-received virtual machine-readable token 804 is stored in the secure element 115B of the CPCD 102B until needed for payment. Additionally, in other embodiments, such as embodiments where a physical token is used for payment, including an EMV card, the previously-described steps of 305-315 may not take place/occur.

In some exemplary embodiments, the virtual machine-readable token 804 may be automatically presented to the MPCD 102C at step 325 through magnetic field transmission (such as a NFC). In other embodiments, the virtual machine-readable token 804 may be rendered/presented at step 325 in the form of a displayable image on a computer screen such as, but not limited to, a two-dimensional bar code along with transmission by NFC.

Advantageously, by using wireless presentment methods requiring close proximity between the CPCD 102B (or EMV card) and the MPCD 102C such as the NFC used in some embodiments, one of ordinary skill will recognize that sensitive account data may be more securely presented to a merchant or other entity than may be possible with other transmission mediums such as optical or radio transmissions. However, it is envisioned that the virtual token 804 may be presented in any number of data presentment formats including, but not limited to, an image of an actual physical token, an encrypted image (e.g., two-dimensional bar code), an optical transmission (e.g., infrared—IR), a radio transmission (e.g., Bluetooth), etc.

The MPCD 102C may capture the encrypted account data by virtue of receiving the virtual machine-readable token 804 (or receiving information from an EMV card) at step 330. In this step, the MPCD 102C may extract or translate the machine-readable token 804 or EMV card in order to derive information such as, but not limited to, payment account identifiers, customer identifiers, etc.

Once the virtual machine-readable token 804 is received at step 330, the MPCD 102C may transmit a payment request along with the encrypted virtual machine-readable token 804 back or data extracted from the token 804/EMV card to the system platform, such as the server 108, at step 335. The payment request may include data that is representative of the merchant, the merchant account, promotional codes, transaction identification number or other data required in order for the system platform to ultimately remit payment to the merchant.

At step 340, the system platform, such as the server 108, receives the payment request and virtual machine-readable token data, which may be encrypted, from the MPCD 102C. In step 345, the server 108 may verify that funds sufficient to cover the payment request are associated with the CPCD 102B account identified in the transmitted virtual token data.

At decision step 350, if funds are found to be insufficient, then the "NO" branch is followed to step 355 in which the system platform may decline to provide payment to the merchant. Notably, some exemplary embodiments may handle insufficient fund determinations in different ways such as, but not limited to, extending credit, accessing related consumer accounts, transmitting partial payments, etc. A transaction declined notice or message may be sent to the MPCD 102C and the method 300 may end. The message may include a code or identifier indicating the reason for declining the transaction.

At decision step 350, if funds sufficient to cover the merchant pay request are determined to be present, then the "YES" branch is followed to step 360 in which the system platform, such as the server 108, may optionally seek to verify that the CPCD 102B remains in presentment mode. By verifying that the CPCD 102B which requested the virtual machine-readable token 804 remains in presentment mode of the virtual machine-readable token 804, authorization to make the funds transfer to cover the merchant payment request may be inferred. In some exemplary embodiments, including embodiments where the CPCD 102B is utilizing a previously-generated virtual machine-readable token 804 for payment, other methods of authorization and/or digital signature may be utilized to provide additional security to the transaction such as, but not limited to, time stamping, use of PINs or passwords from the CPCD 102B user, etc.

In decision step 365, the server 108 determines if the CPCD 102B is in the presentment mode for rendering the virtual machine-readable token 804 and/or whether any other security measures in place have been satisfied. If the presentment mode is not active and/or the other security measures have not been satisfied, then the "NO" branch is followed to step 370 in which the transaction may be declined by the server 108. In step 370, a transaction declined notice or message may be sent to the MPCD 102C and the method 300 may end. The message may include a code or identifier indicating the reason for declining the transaction.

If the inquiry to decision step 365 is positive, meaning that authorization is inferred by determining that the requesting CPCD 102B remains in a presentment mode for rendering the virtual machine-readable token 804, or any other applicable security measures have been satisfied, then the "YES" branch is followed to step 375. In step 375, the system platform, such as the server 108, may instruct that funds be debited from the consumer account associated with the virtual machine-readable token 804 or EMV card and subsequently credited to the merchant account identified in the merchant request.

After step 375 is complete, the merchant has been compensated for the goods or services provided to the consumer. If desired for merchants without a separate POS system 122, a digital receipt may be generated such as by e-mailing or otherwise transmitting a record of the transaction and/or the transaction may be digitally signed, such as by attaching a time stamp, attaching a private key or code from the merchant, etc., to the transaction.

For embodiments where the merchant does have a separate POS system 122, the transaction may still "remain open" and not reconciled even though the merchant's account has received funds. For such embodiments, turning to FIG. 6, once the funds have been remitted from the consumer account to the merchant account, at step 380, the system platform, such as the server 108, may confirm the transaction and transaction ID in the form of an electronic receipt 169 delivered back to the merchant's MPCD 102C. Additionally, in some exemplary embodiments, a similar receipt or same electronic receipt 169 may be transmitted to the consumer's CPCD 102B.

With the confirmation electronic receipt 169 resulting from step 380, at step 385, the merchant may input the transaction ID listed on the electronic receipt 169 into the POS system 122 as verification of payment for the goods and services, thus closing out the transaction. In some situations, such as the exemplary restaurant POS system 122 described in connection with FIG. 1, the merchant may "override" the open bill in the POS system 122 via a "manager's comp," "closing to cash" or otherwise zeroing out the open tab at step 390.

By reconciling the open transaction in the POS via the transaction ID listed on the electronic receipt 169, a traditional physical receipt may be generated by a legacy POS system 122 at step 395 which includes the transaction ID for later cross-referencing by the consumer against a virtual payment transaction ID. In other exemplary embodiments, the MPCD 102C may be operable to transmit the relevant transaction/confirmation data from the electronic receipt 169 to the POS 122 for logging against a closed out tab.

Figure 7A:
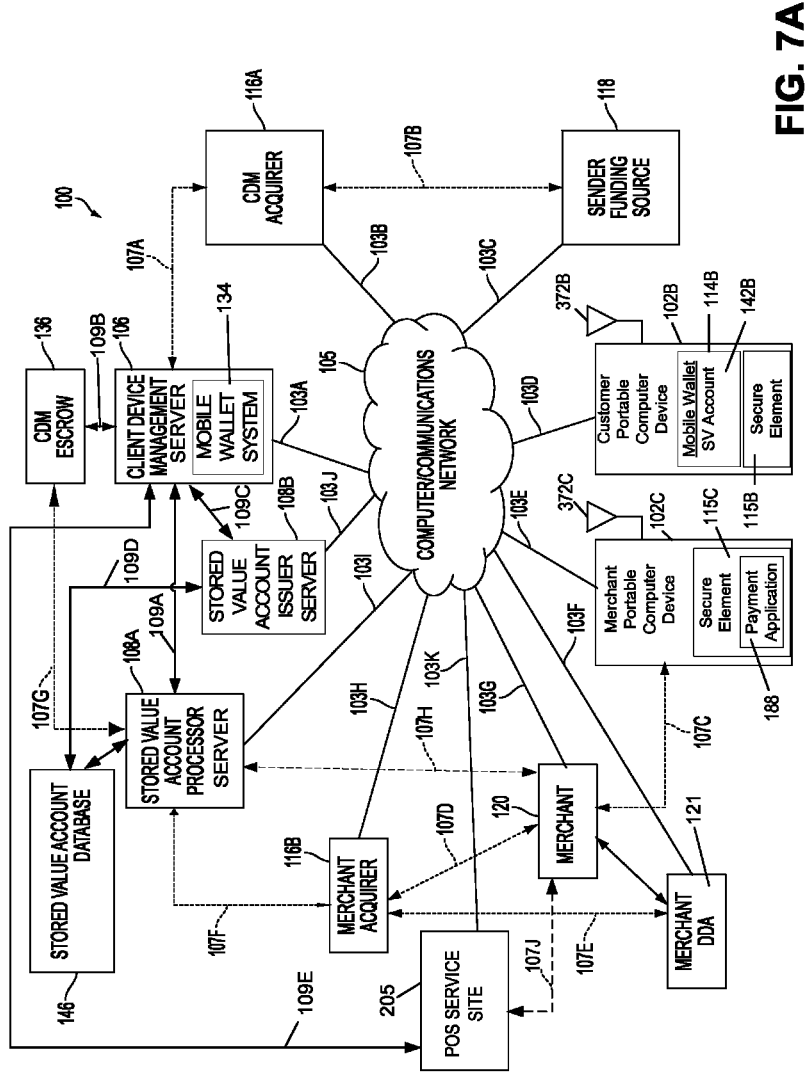
FIG. 7A is a diagram of an exemplary system for using a merchant portable computing device to accept payments from a customer for goods and services tendered by the merchant.

Referring to FIG. 7A, this figure is a diagram of another aspect of the system 100. As described above, a portable computing device 102, such as CPCD 102B may be associated with a credit account or a stored value account such as, but not limited to, a gift card account, a checking account, a savings account, etc. Stored value accounts 142 may include gift card accounts available from various merchants 120. Moreover, and in addition to that which is outlined above, stored value accounts 142 cover and may include, but are not limited to, payroll cards, government benefit cards, prepaid debit cards, and telephone.

There are usually two main categories of stored value accounts 142: (a) single-purpose or "closed-loop" accounts and (b) "open-loop" accounts. Gift cards, which may only be used to purchase goods at particular retailers, and prepaid telephone cards, which may only be used to make telephone calls, are examples of single-purpose stored value accounts 142.

The second type of account 142 is a multipurpose or "open-loop" account 142, which may be used to make debit transactions at a wide variety of retail locations (not limited to a single retailer), as well as for other purposes, such as receiving direct deposits and withdrawing cash from ATMs. Some multipurpose accounts may be a branded credit card network, such as VISA™ or MASTERCARD™ brand networks, and may be used wherever those brands are accepted. The stored value account 142 of this disclosure covers both open-loop and closed-loop types.

The system 100 may include a system platform in communication with a sender funding source 118, portable computing devices 102, and a merchant 120. The system platform of system 100 may comprise a computing device management server 106, a stored value account processor server 108A, a stored value account issuer server 108B, a merchant acquirer 116B, and a computing device management ("CDM") acquirer 116A, among other components.

Many of the system elements illustrated in FIG. 7A are coupled via communications links 103A-K to a computer or communications network 105. The links 103 illustrated in FIG. 7A may be wired or wireless links. Wireless links include, but are not limited to, radio-frequency ("RF") links, infrared links, acoustic links, and other wireless mediums. The communications network 105 may comprise a wide area network ("WAN"), a local area network ("LAN"), the Internet, a Public Switched Telephony Network ("PSTN"), a paging network, or a combination thereof.

Many of the system elements illustrated in FIG. 7A (and FIG. 1) are also shown to be coupled by virtual communication links 107A-J illustrated with dashed lines. The virtual communication links 107 depict direct communications between elements when, in fact, the actual communications are supported by the multiple communications links 103 that couple a respective element to the communications network 105. The virtual communication links 107 are shown for exemplary purposes and for understanding the flow of communications between and among respective elements in the system 100. The computing device management server 106 may support a mobile wallet system 134 which is responsible for managing and maintaining mobile wallets 114 that are stored in memory by CPCDs 102B.

Each portable computing device 102 is shown to have an antenna 372 so that a respective portable computing device 102 may establish wireless communication links 103 with the communications network 105. However, portable computing devices 102 which have wired or hard line links 103 to the communications network 105, such as laptop or handheld computers, are included within the scope of the invention.

The client portable computing device management server 106 may communicate with the CPCD 102B in order to establish a stored value account 142 that may be created and sent to a mobile wallet 114B of a recipient client portable computing device 102B. The client portable computing device management server 106 also works with the stored value account processor server 108A and the stored value account issuer server 108B in order to manage transactions associated with the stored value accounts 142.

The stored value account processor server 108A may work directly with a merchant acquirer 116B that also works with a merchant 120. In some instances, a merchant 120 may work directly with the stored value account processor server 108A without sending communications through or receiving communications from a merchant acquirer 116B.

The stored value account issuer server 108B may be responsible for establishing/creating the stored value accounts 142 managed and held in the stored value account database 146. Specifically, the stored value account issuer server 108B is responsible for creating and managing the client unique identifiers 155, virtual card identification numbers 167, primary account numbers ("PANs") 165, and merchant identifiers 170 of FIG. 7AB discussed in greater detail below. While the stored value account issuer server 108B and stored value account processor 108A have been illustrated in FIG. 7A as separate elements, one of ordinary skill in the art recognizes that a single computer server could perform the functions of these two elements. With this in mind, the remaining disclosure, on occasion, may refer to the stored value account processor server 108A and stored value account issuer server 108B as a single hardware/software element.

The merchant 120 may accept and process stored value accounts 142 in exchange for goods and services. The client portable computing device management server 106 may communicate with a client portable computing device management ("CDM") acquirer 116A. The CDM acquirer 116A communicates with a sender funding source 118. The sender funding source 118 may comprise a financial institution that maintains a contractual relationship with a merchant 120 or the client portable computing device management server 106.

An acquirer 116 typically acts as a "middleman," receiving credit card transactions from a merchant 120 (or the client portable computing device management system 106) and then settles those transactions with an issuing financial institution, such as a bank. An acquirer 116 may deposit funds into a depository bank account, such as the client portable computing device management ("CDM") escrow account 136 or the merchant demand deposit account ("DDA") 120, and recoup those funds from a credit card issuer, or other entity.

Funds from a demand deposit account ("DDA") 121 may be accessed by check, debit card, or an automated clearinghouse as known to one of ordinary skill in the art. A DDA 121 may comprise a checking account, or other draft account. Usually, the merchant 120 or operator of the client portable computing device management server 106 must pay certain fees to an acquirer 116 for handling credit card type transactions, as is known to one of ordinary skill in the art.

The sender funding source 118 may comprise a financial institution, such as a bank, that is associated with a user of the CPCD 102B. The sender funding source 118 may be accessed by a CPCD 102B to create or fund a stored value account 142 for another CPCD 102B (not illustrated). The stored value account 142 may be managed and serviced by the stored value account processor server 108A and stored value account issuer server 108B which receive all of their client portable computing device communications from the client portable computing device management server 106.

The stored value account processor server 108A and the stored value account issuer server 108B may maintain a database 146 of stored value accounts 142 that may be associated with a plurality of client portable computing devices 102. The stored value account processor server 108A may also communicate with merchant acquirers 116B or merchants 120 directly in order to process any request from a client portable computing device 102 to a merchant 120 for redeeming a value of a stored value account at a point of sale ("POS") terminal or in a virtual store environment present on a computer/communications network 105.

According to an exemplary embodiment, a merchant 120 with an account on the POS service site 205 may use an MPCD 102C to accept payment from the CPCD 102B, an EMV card, or other payment source. In the exemplary embodiment where payment is made by the CPCD 102B or EMV card, the payment application 188 receives the information from the CPCD 102B or EMV card and parses or extract the necessary customer account data to accept payment. The payment application 188 then processes the payment transaction, accepting payment for the merchant. The MPCD 102C may then either directly, or through POS service site 205, communicate with the client portable computing device management server 106, providing the extracted customer account data and/or additional information about the payment transaction. The client portable computing device management server 106 may process the communication from the MPCD 102C and corresponding payment for the stored value account(s) 142, or other accounts, which may be associated with the CPCD 102B, eliminating various steps and "middlemen" in traditional transactions. In this manner, one or more merchant MPCDs 102C may act as a payment acceptor for the merchant, regardless of whether the merchant has a POS system 122, or regardless of whether a merchant's POS system 122 is able to accept the type of payment being offered by the customer.

In exemplary embodiments where a CPCD 102B desires to use one of a plurality of stored value accounts 142 or credit accounts, the CPCD 102B may select the account to be used for payment before communication between the CPCD 102B and MPCD 102C, such as communicating a virtual machine-readable token 804 to the MPCD 102C as described above with respect to the embodiments illustrated in FIGS. 1 and 5.

In other embodiments, the CPCD 102B may communicate with the MPCD 102C and the operator of the MPCD 102C may be prompted to have the customer identify which among the plurality of customer stored value or credit accounts identified by the MPCD 102C will be used for payment. Each MPCD 102C may be appropriately equipped to handle all types of wireless transactions whether by redemption presentations in a visual manner by a CPCD 102B displaying a machine-readable optical code or by NFC communications, etc.

The system 100 may provide certain advantages when the client portable computing device 102A, B comprises a mobile wireless device such as a mobile telephone so that a merchant 120 may be provided with geographical coordinates of the recipient client portable computing device 102B as well as the identity of the user of the client portable computing device 102B by the client portable computing device management server 106. In this way, by knowing the identity of the recipient client portable computing device 102B and the geographical coordinates of the recipient client portable computing device 102B, the merchant 120 may be able to send offers or promotions to the recipient client portable computing device 102. In this manner, offers or promotions that are unique to a particular merchant 120 may be specifically targeted to a recipient 102B.

According to other exemplary aspects of the system 100, the CPCD 102B may be provided with the capability of exchanging stored value accounts 142 associated with various different merchants 120. In other words, the CPCD 102B may take all or some of the value of a first stored value account 142 associated with a first merchant 120 in order to purchase and/or fund a second stored value account associated with a second merchant 120 which is different from the first merchant 120. Regardless of how the CPCD 102B may combine such stored value accounts 142, the MPCD 102C is able to accept payment via the data captured from the virtual machine-readable token 804.

Figure 7B:
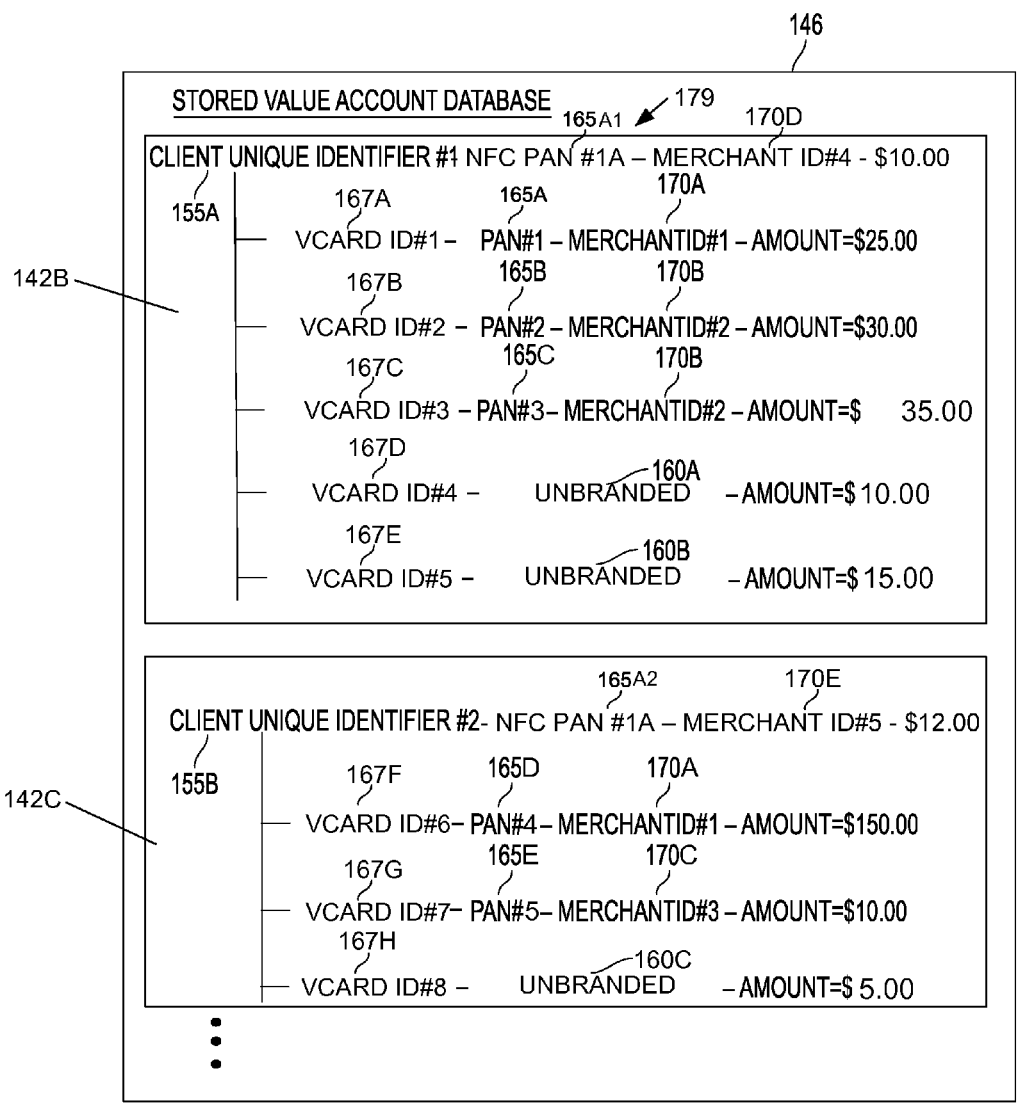
FIG. 7B is a diagram of a data structure for a stored value account database managed by the stored value account processor server and the stored value account issuer server illustrated in FIG. 7A.

Referring to FIG. 7B, this figure is a diagram of a data structure 179 for a stored value account database 146 managed by the stored value account processor server 108A and the stored value account issuer server 108B illustrated in FIG. 7A. The data structure 179 may comprise a client unique identifier 155 and one or more primary account numbers ("PANs") 165 and one or more virtual card identification numbers ("VCARD ID#") 167. The PANs 165 and VCARD IDs 167 may be created for each stored value account 142 associated with a respective client portable computing device 102. The client portable computing device management server 106 may be responsible for creating the client unique identifier 155 and passing this unique identifier 155 to the stored value account issuer server 108B. Alternatively, the stored value account issuer server 108B may create the client unique identifier 155.

The client unique identifier 155 may comprise an alphanumeric character string of a predefined length. For example, the alphanumeric character string may comprise a ten digit string. However, alphanumeric strings greater than or less than ten digits are within the scope of the invention.

The client unique identifier 155 may be associated with a virtual card identification number ("VCARD ID#") 167 and unbranded account 160 when the CPCD 102B establishing an account does not designate a particular merchant 120 to be associated with a set of funds for the stored value account 142. In other words, the unbranded account 160 may keep track of the funds which have been allocated to the stored value account 142 of a user who has a client unique identifier 155 but have not been associated with any particular merchant 120, such as a TARGET™ or K-MART™ brand store. The unbranded account 160 will not have any merchant name associated with the account but will have a virtual card identification number ("VCARD ID #") 167 associated with the unbranded account 160. The VCARD ID #167 is associated with the client unique identifier 155.

For funds or value that have been purchased using a CPCD 102B and that have been designated for a particular merchant 120, such funds may be assigned to a unique primary account number ("PAN") 165 that is associated with the particular merchant 120. The unique PAN 165 may also be referred to in the industry as a bank card number and is the primary account number found on most credit cards and bank cards. The PAN 165 may be governed by an industry standard, such as those made by the International Organization for Standardization/International Electrotechnical Commission ("ISO")/("IEC"). The PAN 165 may have a certain amount of internal structure and it may share a common numbering scheme among all PANs 165 issued by the stored value account issuer server 108B.

One particular standard for the PAN 165, as of this writing, may include the ISO/IEC 7812 standard. The ISO/IEC 7812 standard contains a single-digit Major Industry Identifier ("MII"), a six-digit Issuer Identification Number ("IIN"), an account number, and a single digit check sum calculated using the Luhn algorithm. The prefix of the PAN 165 may be the sequence of digits at the beginning of the number that determine the credit card network to which the number belongs. The first 6 digits of the PAN 165 may be referred to as the Issuer Identification Number ("IIN"). These identify the institution that issued the card to the card holder. The rest of the number may be allocated or determined by the issuer, such as the stored value account issuer server 108B. The PAN 165 may comprise a sixteen digit number, but other multi-digit numbers as well as alphanumeric identifiers are within the scope of the invention.

Multiple PANs 165 may be associated with the client unique identifier 155. In other words, a single client unique identifier 155 may reference a plurality of different PANs 165, in which each PAN 165 corresponds to a particular merchant 120. This means that a single client portable computing device 102, which is assigned the client unique identifier 155, may have access to several dozen or hundreds of merchants 120 that have respective different PANs 165.

In the exemplary embodiment illustrated in FIG. 7A, the first stored value account 142A has a client unique identifier 155A of "client unique identifier #1" which has been associated with two unbranded accounts 160A and 160B that have been assigned virtual card identification numbers ("VCARD ID #") 167D and 167E respectively. The first unbranded account 160A has stored value of $10.00. The second unbranded account 160B has stored value of $15.00. The separate unbranded accounts 160A and 160B allow for the tracking of separate gifts that may have been created by different users of CPCDs 102B or separate gifts created by a single user of a single CPCD 102B.

The client unique identifier 155A has been associated with three primary account numbers ("PANs") 165A, 165B, 165C that are assigned to a first merchant having a merchant identifier 170A of "Merchant ID#1" and a second merchant having a merchant identifier 170B of "Merchant ID#2." The virtual card associated with the first PAN 165A has a stored value of $25.00 and the virtual card associated with the second PAN 165B has a stored value of $30.00. The virtual card associated with the third PAN 165C has a stored value of $35.00. The second and third virtual cards having PAN#2 and PAN#3 and associated with only the second merchant identifier 170B illustrate that a user of the recipient client portable computing device 102B may receive two separate gifts of different or same values but which are associated with the same merchant 120. While US currency has been used in these examples, one of ordinary skill in the art recognizes that any type of monetary currency may be used and is within the scope of the invention.

While the first unbranded account 160A associated with the VCARD ID#4 167D has a stored value of $10.00, according to one exemplary embodiment of the invention, a user of the recipient client portable computing device 102B may need to associate the funds of the unbranded first account 160A with a particular merchant 120 prior to being able to redeem the value of the first unbranded account 160A. In this particular example, a user of the client portable computing device 102 could transfer the funds from the unbranded account 160A to either the first or second virtual cards associated with the first PAN 165A or the second PAN 165B. Alternatively, a user could create a new virtual card associated with a new merchant 120 (relative to the merchants 120 represented by the merchant identifiers 170A, 170 in the account 142B) or an existing merchant 120 that has a fourth PAN 165 (not illustrated) for this stored value account 142A.

Also associated with each client unique identifier 155 may be one or more near field communication ("NFC") PANs 165, such as NFC PAN #1A 165A1 associated with client unique identifier #1 155A of the first stored value account 142B in FIG. 6 and NFC PAN #1B 165A2 associated with client unique identifier #2 155B of the second stored value account 142C in FIG. 6. These NFC PANs 165 correspond to physical tokens which may be attached to a client portable computing device 102 and which utilize near-field communications to exchange information with point-of-sale ("POS") terminals as is known to one of ordinary skill in the art.

The system 100 may also provide certain advantages when the CPCD 102B comprises a mobile wireless device such as a mobile telephone so that a merchant 120 may be provided with geographical coordinates of the CPCD 102B, as well as the identity of the user of the CPCD 102B by the client portable computing device management server 106. In this way, by knowing the identity of the recipient CPCD 102B and the geographical coordinates of the recipient CPCD 102B, security of the transactions between customer and merchant 120 may be enhanced.

Turning to the MPCD 102C, according to an exemplary embodiment where an MPCD 102C is linked to multiple merchant financial accounts, when payment is received by the MPCD 102C, the operator of the MPCD 102C may select, or may be prompted to select, an appropriate merchant financial account into which the money from the payment shall be placed.

For example, in the case of a restaurant supply merchant 120 selling supplies to a restaurant customer, the restaurant customer may have a line of credit or other account with the restaurant supply merchant 120. The MPCD 102C being used to accept payment from the restaurant customer may be associated with a merchant account at the POS service site 205 that is linked to the customer's line of credit and to the merchant's checking account. When the MPCD 102C receives payment from the restaurant customer, the operator of the MPCD 102C may select, or may be prompted to select, whether the payment from the customer will be applied against the customer's line of credit, or routed to the merchant's checking account.

The system 100 may provide certain advantages when the MCPD 102C comprises a mobile wireless device such as a mobile telephone. For example, in embodiments where the MPCD 102C is a mobile wireless device such as a mobile telephone, a merchant 120 may accept payments at locations remote from the merchant's office location, even in situations where the MPCD 102C is not in communication with the merchant's office location and/or a merchant's POS system 122. Using the example of a merchant 120 that is a restaurant, the merchant 120 may use one or more MPCD 102C to accept payment from customers both at the restaurant and at the customer's house for delivery orders, regardless of whether the operator of the MPCD 102C is able to communicate with the restaurant's POS system 122 (such as for example if the restaurant's POS system 122 breaks).

Similarly, in embodiments where the MPCD 102C is a mobile wireless device such as a mobile telephone, the merchant 120 may elect to have the POS service site 205 provide over-the-air (OTA), wireless, or other updates to a merchant's MPCDs (or to a specified groups of a merchants MPCDs). In such embodiments, a merchant's MPCDs can be updated in real-time, to include updated information about newly created or released gift card programs, stored value accounts, etc., allowing a seamless transition for the merchant to such new programs/accounts.

The merchant 120 may include a restaurant as described above in connection with FIG. 1, or may include any provider of goods and/or services, including those with a brick-and-mortar store locations, those operating temporary and/or mobile vending locations, those operating kiosk-type locations, those using a virtual shopping cart over a computer/communications network 105, etc., or any combination thereof.

Additionally, as discussed above, by managing one or more accounts with the POS service site 205, a merchant 120 may group one or more MPCD 102C to operate with one or more of the types of merchant locations. For example, one grouping of MPCDs may be configured to operate with a merchant's brick-and-mortar store locations, while another grouping of MPCDs may be configured to work with a merchant's mobile vending locations or kiosks.

The CPCD 102B may be a mobile wireless device such as a smartphone or mobile telephone, a pad or tablet-type device, a laptop or netbook-type computer, etc. in whatever form desired and including any device that contains one or more of the foregoing. Similarly, the MPCD 102C may be a mobile wireless device such as a smartphone or mobile telephone, a pad or tablet-type device, a laptop or netbook-type computer, a desktop computer, a kiosk, etc., in whatever form desired and including any structure or device that contains one or more of the foregoing.

Figure 8:
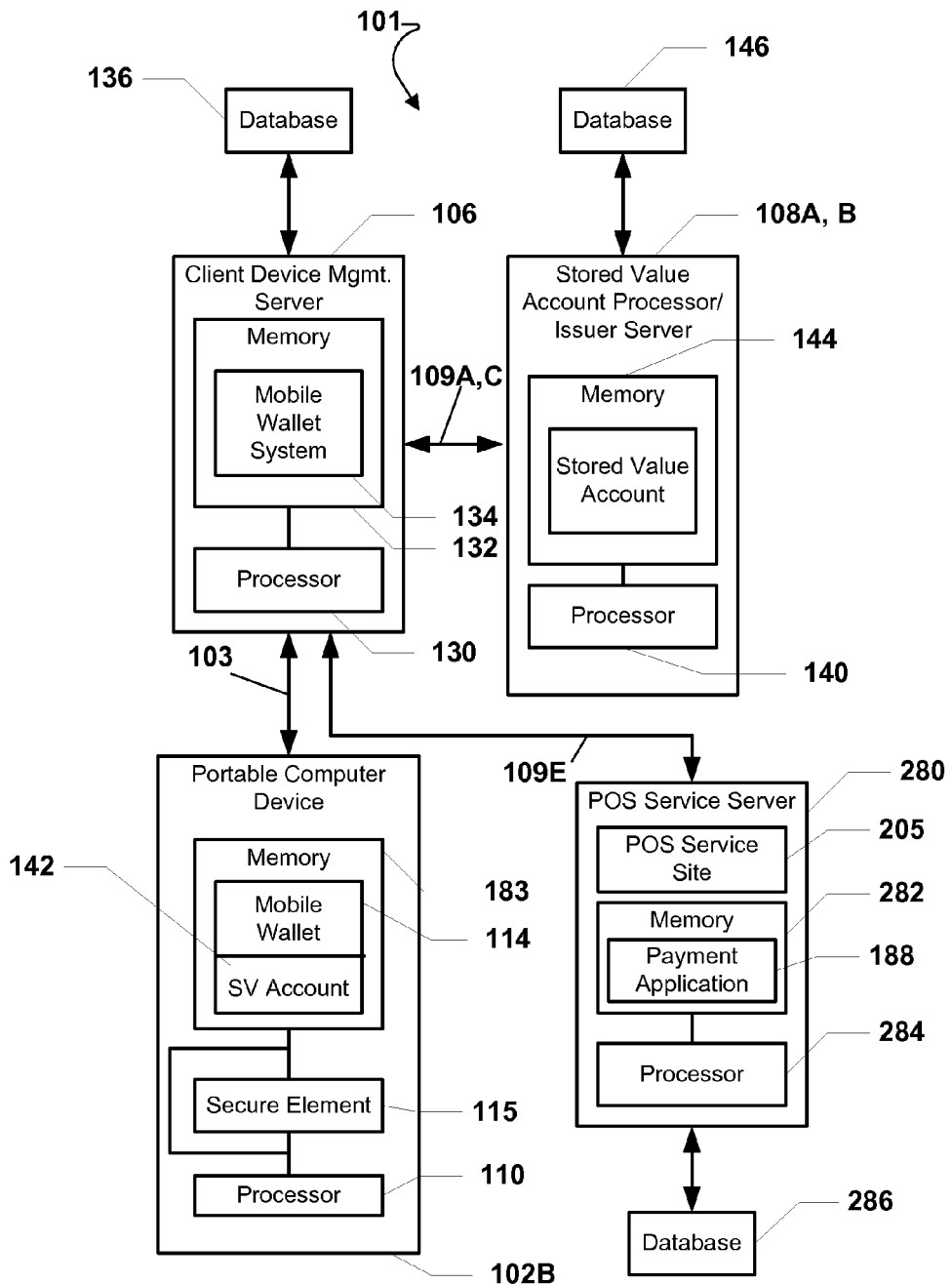
FIG. 8 is a diagram of an exemplary system platform, POS service server, and portable computer device architecture for the system of FIGS. 1 and 7.

FIG. 8 is a diagram of an exemplary computer architecture 101 for the system 100 of FIG. 7A. The exemplary architecture 101 may include a portable computing device 102. A client portable computing device server 106 may be connected to a CPCD 102B. The client portable computing device management server 106 may be connected to the CPCD 102B via a wired or wireless communications link 103, such as a mobile telephone network.

Further, the client portable computing device management server 106 may be connected to a stored value account processor/issuer server 108A, B via a direct communications link 109A,C, such as by a WAN. As noted previously, the stored value account processor server 108A and the stored value account issuer server 108B may be two physically separate devices or software as illustrated in FIG. 7A, or alternatively, the functions of these two elements 108A, B may be performed by a single device or software module as illustrated in FIG. 8. One of ordinary skill in the art will appreciate that either option may be selected depending upon computer architecture design constraints and without departing from the scope of the invention.

The exemplary architecture 101 may also include a POS service server 280 where the POS service site 205 resides. The POS service server 280 may be connected to a MPCD 102C (not illustrated in FIG. 8). The POS service server 280 may be connected to the portable computing device 102 via a wired or wireless communications link, such as a mobile telephone network.

Further, the POS service server 280 may be connected to the client portable computing device management server 106 via a direct communications link 109E, such as by a WAN. As depicted in FIG. 8, the POS Service Sever 280 may include a processor 284 and a memory 282 coupled to the processor 284. The memory 282 may include instructions for one or more of the method steps described herein. The memory 282 may comprise the payment application 188 that is downloaded to a MPCD 102C (not illustrated). Further, the processor 284 and the memory 282 may serve as a means for executing one or more of the method steps described herein. A database 286 may also be connected to the POS service sever 280. The database 286 may include information associated with the merchant accounts on the POS service site 205, and other information associated with the merchant or one or more MPCDs.

As illustrated in FIG. 8, the CPCD 102B may include a processor 110, a memory 183 coupled to the processor 110 and a secure element 115 coupled to the processor 110 and the memory 183. The secure element 115 may be a may be implemented in firmware, hardware, software, or any combination thereof, and may be embedded in other components of the portable computing device 102 such as in a SIM card 446 (see. FIG. 10). Similarly, the secure element 115 may be separate and apart from the memory 183 as shown in FIG. 8, or may be a portion of the memory 183. The memory 183 and/or secure element 115 may include instructions for executing one or more of the method steps described herein. Further, the processor 110, memory 183, and/or secure element 115 may serve as a means for executing one or more of the method steps described herein.

As indicated, the memory 183 may also include a mobile wallet 114 in the case that the portable computing device 102 is a CPCD 102B. The mobile wallet 114 may be provided to the mobile device 102 by the client portable computing device management server 106. A mobile wallet 114 provides functions similar to a traditional wallet in that it may contain account information and provide virtual tokens that allow a user to access money or credit from the client portable computing device management server 106, and which allows a user to carry such information in his or her pocket.

FIG. 8 shows that the client portable computing device management server 106 may include a processor 130 and a memory 132 coupled to the processor 130. The memory 132 may include instructions for executing one or more of the method steps described herein. Further, the processor 130 and the memory 132 may serve as a means for executing one or more of the method steps described herein. As illustrated, the memory 132 may include a mobile wallet 134 that provides information for one or more stored value accounts 142 as well as other types of accounts, such as, but not limited to, credit card accounts and bank accounts.

The mobile wallet 134 within the client portable computing device management server 106 may be similar to the mobile wallet 114 stored within the mobile device 102. Further, the mobile wallet 134 within the client portable computing device server 106 may include substantially the same information as the mobile wallet 114 stored within the client portable computing device 102. The CDM escrow database 136 may also be connected to the client portable computing device management server 106.

As depicted in FIG. 8, the stored value account processor/issuer server 108A, B may include a processor 140 and a memory 144 coupled to the processor 140. The memory 144 may include instructions for one or more of the method steps described herein. Further, the processor 140 and the memory 144 may serve as a means for executing one or more of the method steps described herein. As illustrated, the memory 144 may include a stored value account 142 associated with a user of the mobile device 102. A database 146 may also be connected to the stored value account processor server/issuer server 108A, B. The database 146 may include account information associated with the stored value account 142 and account information associated with other user accounts associated with other mobile devices.

Figure 9:
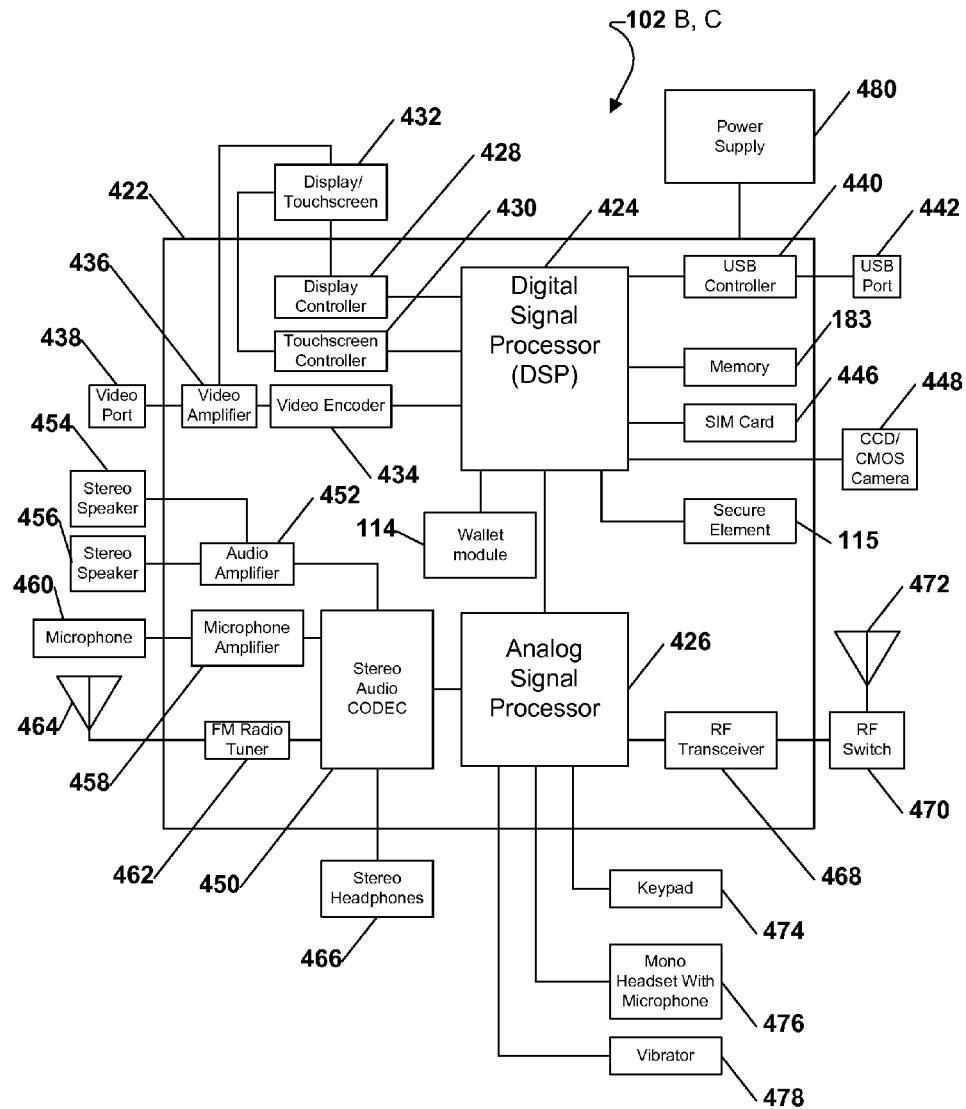
FIG. 9 is a diagram of an exemplary, non-limiting aspect of a PCD comprising a wireless telephone which corresponds with FIGS. 1 and 7.

Referring to FIG. 9, this figure is a diagram of an exemplary, non-limiting aspect of a portable computing device 102 comprising a wireless telephone for use in the exemplary embodiments shown in FIGS. 1, 7, and/or 8. As shown, the portable computing device 102 includes an on-chip system 422 that includes a digital signal processor 424 and an analog signal processor 426 that are coupled together. As illustrated in FIG. 9, a display controller 428 and a touchscreen controller 430 are coupled to the digital signal processor 424. A touchscreen display 432 external to the on-chip system 422 is coupled to the display controller 428 and the touchscreen controller 430.

FIG. 9 further indicates that a video encoder 434, e.g., a phase-alternating line ("PAL") encoder, a sequential couleur avec memoire ("SECAM") encoder, a national television system(s) committee ("NTSC") encoder or any other video encoder, is coupled to the digital signal processor 424. Further, a video amplifier 436 is coupled to the video encoder 434 and the touchscreen display 432. A video port 438 is coupled to the video amplifier 436. As depicted in FIG. 9, a universal serial bus ("USB") controller 440 is coupled to the digital signal processor 424. Also, a USB port 442 is coupled to the USB controller 440. A memory 183 and a subscriber identity module (SIM) card 446 may also be coupled to the digital signal processor 424. A secure element 115 may also be coupled to the digital signal processor 424, either as a separate component, or as part of another component, such as, but not limited to, the memory 183 or SIM card 446. Further, a digital camera 448 may be coupled to the digital signal processor 324. In an exemplary aspect, the digital camera 448 is a charge-coupled device ("CCD") camera or a complementary metal-oxide semiconductor ("CMOS") camera.

As further illustrated in FIG. 9, a stereo audio CODEC 450 may be coupled to the analog signal processor 426. Moreover, an audio amplifier 452 may be coupled to the stereo audio CODEC 450. In an exemplary aspect, a first stereo speaker 454 and a second stereo speaker 456 are coupled to the audio amplifier 452. FIG. 9 shows that a microphone amplifier 458 may be also coupled to the stereo audio CODEC 450. Additionally, a microphone 460 may be coupled to the microphone amplifier 458. In a particular aspect, a frequency modulation ("FM") radio tuner 462 may be coupled to the stereo audio CODEC 450. Also, an FM antenna 464 is coupled to the FM radio tuner 462. Further, stereo headphones 466 may be coupled to the stereo audio CODEC 450.

FIG. 9 further indicates that a radio frequency ("RF") transceiver 468 may be coupled to the analog signal processor 426. An RF switch 470 may be coupled to the RF transceiver 468 and an RF antenna 472. As shown in FIG. 9, a keypad 474 may be coupled to the analog signal processor 426. Also, a mono headset with a microphone 476 may be coupled to the analog signal processor 426.

Further, a vibrator device 478 may be coupled to the analog signal processor 426. Also shown is that a power supply 480 may be coupled to the on-chip system 422. In a particular aspect, the power supply 480 is a direct current ("DC") power supply that provides power to the various components of the client portable computing device 102 that require power. Further, in a particular aspect, the power supply is a rechargeable DC battery or a DC power supply that is derived from an alternating current ("AC") to DC transformer that is connected to an AC power source.

FIG. 9 also shows that the portable computing device 102 may include a wallet module 114, especially in the case where the portable computing device 102 is a CPCD 102B. The wallet module 114 may communicate with the client portable computing device management server 106 to update wallet information stored in the portable computing device 102. As depicted in FIG. 9, the touchscreen display 432, the video port 438, the USB port 442, the camera 448, the first stereo speaker 454, the second stereo speaker 456, the microphone 460, the FM antenna 464, the stereo headphones 466, the RF switch 470, the RF antenna 472, the keypad 474, the mono headset 476, the vibrator 478, and the power supply 480 are external to the on-chip system 422.

In a particular aspect, one or more of the method steps described herein may be stored in the memory 183 as computer program instructions. These instructions may be executed by the digital signal processor 424, the analog signal processor 426, or another processor, to perform the methods described herein. Further, the processors, 424, 426, the memory 183, the secure element 115, the instructions stored therein, or a combination thereof may serve as a means for performing one or more of the method steps described herein.

Figure 10A:
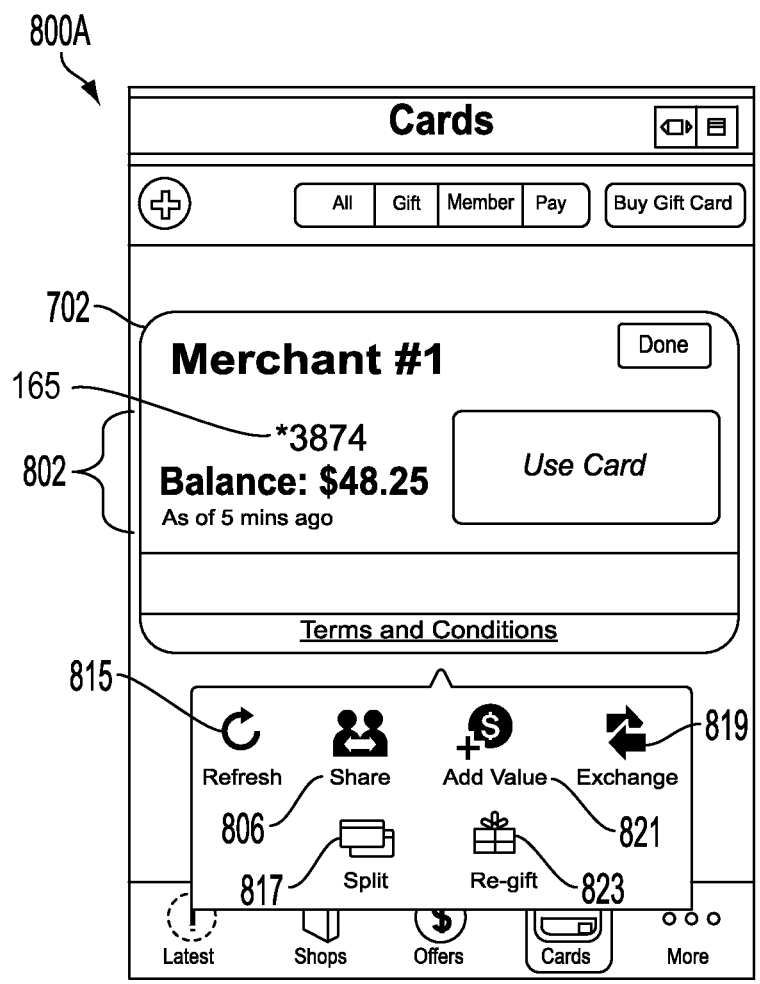
FIG. 10A is a diagram of an exemplary screen on a PCD that lists options for managing a stored value account associated with the PCD that may be used by a customer for payment.

Referring to FIG. 10A, this is an illustrative diagram of a screen 800A that may be displayed on a CPCD 102B. The exemplary screen 800A lists options for viewing and managing a stored value account 142 that may be used by a customer for payment in accordance with embodiments described above. The options screen 800A may comprise virtual token 702 having a listing of account information 802 associated with the stored value account 142 such as the name of the merchant "Merchant #1", the last four digits of the multi-digit digit primary account number ("PAN") 165, a current value, and a graphical representation of a magnetic stripe so that the user of the CPCD 102B may determine whether to use the stored value account 142 for payment.

The options screen 800A may optionally comprise icons that are associated with different options for managing the stored value account 142. Such icons may be illustrated with symbols to suggest their intended functions. Such icons may be associated with, but are not limited to, the following functions/operations: refresh 815, a share function 806, a split function 817, an add value operation 821, an exchange operation 819, and a re-gift operation 823.

If the share card icon 806 is selected by a user, then the user of the CPCD 102B may send a portion or all of the value associated with the stored value account 142 to another portable computing device 102. Activating this icon or button 806 may initiate another user interface that instructs the user how the value associated with the stored value account 142 may be shared with another portable computing device 102. The recipient of a shared stored value account 142 may have reduced functionality for shared stored value accounts 142. The shared stored value account recipient may be restricted to the following actions: viewing the current available balance of the shared stored value account 142; and presenting the shared stored value account 142 at a merchant POS system 122.

If the refresh icon 815 is selected by a user, then the activation of this icon may allow the screen 800A to refresh itself so that a current balance of the virtual token 702 is displayed in the account information 802. If the stored value account 142 associated with the virtual token 702 is being shared, then other users may be making purchases or withdrawals relative to the stored value account 142. In such circumstances of simultaneous use of the same stored value account 142, the current account balance becomes very relevant to a user who is about to purchase a good or service using the virtual token 702 and corresponding stored value account 142.

The split icon 817 when selected may activate an operation that allows the user of the recipient client portable computing device to split the funds associated with a single PAN 165 so that two sets of the total value of the funds are now associated with two PANs 165. In essence, this split function allows the user of the recipient client portable computing device 102B to create two virtual tokens 702 having two values based on single virtual token 702 that had an original value.

The exchange icon 819 allows a user of the client portable computing device 102 to exchange value associated with one merchant for value with another merchant. The re-gift icon 823 allows a user of a client portable computing device 102 to send a stored value account to another recipient client portable computing device 102B. Other options for managing a stored value account 142, though not specifically illustrated, are within the scope of the invention as understood by one of ordinary skill in the art.

Figure 10B:
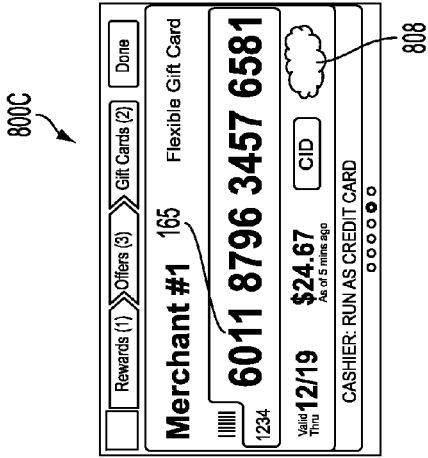
FIG. 10B is a diagram of an exemplary detailed purchase/redemption presentation screen of a virtual token for a stored value transaction illustrating associated account data in the form of a bar code.

FIG. 10B is a diagram of an exemplary purchase/redemption presentation screen 800B for a stored value transaction using CPCD 102B. This screen 800B may be generated in response to a user of the CPCD 102B selecting the "use card" button listed on the virtual token 702 of FIG. 10A or in response to any other method of selecting the customer account to be used to pay a merchant. In accordance with the exemplary system 100 illustrated in FIG. 1, the purchase/redemption presentation screen 800B of FIG. 10B may be presented on the CPCD 102B so that the customer may show this information in addition information transferred from the CPCD 102B to the MPCD 102C over the communication link 103K. A merchant may use a scanner to enter a one-dimensional barcode 804A on the MPCD 102C of FIG. 1. Exemplary one-dimensional bar codes may include, but are not limited to, U.P.C., Codabar, Code 25—Non-interleaved 2 of 5, Code 25—Interleaved 2 of 5, Code 39, Code 93, Code 128, Code 128A, Code 128B, Code 128C, Code 11, CPC Binary, DUN 14, EAN 2, EAN 5, EAN 8, EAN 13, Facing Identification Mark, GS1-128 (formerly known as UCC/EAN-128), GS1 DataBar formerly Reduced Space Symbology ("RSS"), HIBC (HIBCC Bar Code Standard), ITF-14, Latent image bar code, Pharmacode, Plessey, PLANET, POSTNET, Intelligent Mail Bar code, MSI, PostBar, RM4SCC/KIX, JAN, and Telepen.

Alternatively, the purchase/redemption screen 800B of FIG. 10B may be transferred along with other information from the CPCD 102B to the MPCD 102C over the communication link 103K and displayed on MPCD 102C for viewing by the operator of the MPCD 102C.

The current value of the stored value account 142 may be retrieved by the CPCD 102B immediately prior to the display of the account information and the barcode 804A to insure it is accurate as possible at the time of sale. The amount of time for the client portable computing device 102 to retrieve the current value of the stored value account 142 may be approximately under five seconds, depending on network availability and other factors. If a delay is experienced, such as on the order of greater than ten seconds, then the last cached balance along with an "as of" date stamp may be displayed by the purchase/redemption screen 800B.

Screen 800B may also be displayed on a CPCD 102B when a user of the recipient CPCD 102B desires to redeem a stored value account 142 for purchasing goods or services at a POS system 122 in a store or if the user wishes to purchase goods and/or services over a telephone network. Screen 800B may also comprise a "watermarked" background 808 that is displayed behind or adjacent the two-dimensional barcode 804. This "watermarked" background 808 may contain an image that has a pattern which may be difficult to reproduce and may be human-readable, such as by a cashier who may check the detailed purchase screen 800 for authenticity.

Information on the detailed purchase screen 800B is usually presented in a clear, high-contrast manner so that it is easily readable by a cashier at a standard distance, such as a distance of approximately thirty-six inches, preferably in a manner consistent with how a traditional physical token, like a credit card number, is typically displayed to a cashier.

Figure 10C:
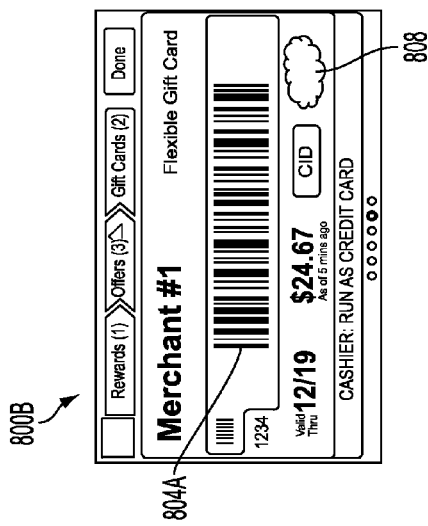
FIG. 10C is a diagram of an exemplary detailed purchase/redemption presentation screen of a virtual token for a stored value transaction illustrating associated account data in the form of a human readable account number.

FIG. 10C is another exemplary diagram of a purchase/redemption presentation screen 800C for a stored value transaction. This purchase screen 800C is generally a human-readable display of stored value account information that may be used by a cashier to manually enter into an MPCD 102C or POS system 122, such as in FIG. 1, to submit for authorization to the server 108, or for a user to enter into a website for an on-line purchase over the Internet. This screen 800C may be generated in response to a user of the CPCD 102B selecting the "use card" button listed on the virtual token 702 of FIG. 10A or in response to any other method of selecting the customer account to be used to pay a merchant.

In accordance with the exemplary system 100 illustrated in FIG. 1, the purchase/redemption presentation screen 800C of FIG. 10C may be presented on the CPCD 102B so that the customer may show this information in addition information transferred from the CPCD 102B to the MPCD 102C over the communication link 103K. Alternatively, the purchase/redemption screen 800C of FIG. 10C may be transferred along with other information from the CPCD 102B to the MPCD 102C over the communication link 103K and displayed on MPCD 102C for viewing by the operator of the MPCD 102C or a merchant POS system 122.

Figure 10D:
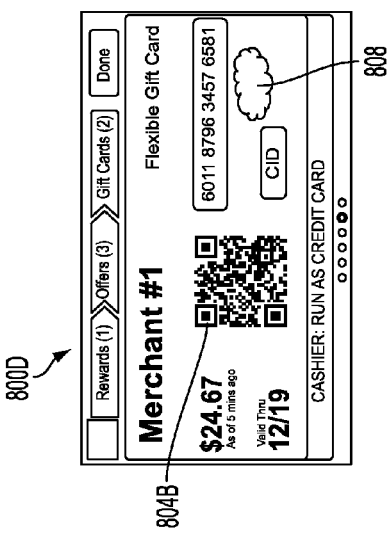
FIG. 10D is a diagram of an exemplary detailed purchase/redemption presentation screen of a virtual token for a stored value transaction illustrating associated account data in the form of a two-dimensional bar code.

FIG. 10D is a diagram of a detailed purchase/redemption presentation screen 800D for a stored value transaction. This diagram is similar to FIG. 10B, however, instead of a one-dimensional bar code being displayed, a two-dimensional barcode 804B is displayed for a merchant using the MPCD 102C to scan such a barcode 804B. The 2-D bar code may include, but is not limited to, the following symbologies: Aztec Code, 3-DI, ArrayTag, Small Aztec Code, Chromatic Alphabet, Chromocode, Codablock, Code 1, Code 16K, Code 49, ColorCode, Compact Matrix Code, CP Code, CyberCode, d-touch, DataGlyphs, Datamatrix, Datastrip Code, Dot Code A, EZcode, Grid Matrix Code, High Capacity Color Bar code, HueCode, INTACTA.CODE, InterCode, MaxiCode, mCode, MiniCode, Micro PDF417, MMCC, Nintendo e-Reader#Dot code, Optar, PaperDisk, PDF417, PDMark, QR Code, QuickMark Code, Semacode, SmartCode, Snowflake Code, ShotCode, SuperCode, Trillcode, UltraCode, UnisCode, VeriCode, VSCode, WaterCode, for example.

This screen 800D may be generated in response to a user of the CPCD 102B selecting the "use card" button listed on the virtual token 702 of FIG. 10A or in response to any other method of selecting the customer account to be used to pay a merchant. In accordance with the exemplary system 100 illustrated in FIG. 1, the purchase/redemption presentation screen 800D of FIG. 10D may be presented on the CPCD 102B so that the customer may show this information in addition information transferred from the CPCD 102B to the MPCD 102C over the communication link 103K. Alternatively, the purchase/redemption screen 800D of FIG. 10D may be transferred along with other information from the CPCD 102B to the MPCD 102C over the communication link 103K and displayed on MPCD 102C for viewing by the operator of the MPCD 102C or a merchant POS system 122.

Additionally, for any of the screens 800B, 800C or 800D, if the CPCD 102B is a desktop or laptop computer or if the recipient CPCD 102B is being used for an e-commerce transaction, then the sixteen digit PAN 165 or other information may be presented on the display device, such as a computer screen, in such a way so as to allow copying and pasting of the sixteen digit PAN 165 or other information into an e-commerce website. The recipient client portable computing device 102B may be provided with text based instructions on how to enter the sixteen digit PAN 165 or other information into an e-commerce website. Exemplary text based instructions may include where to find the expiration date associated with the sixteen digit PAN 165 and what to enter if a card verification value ("CVV") or card identification ("CID") number is requested by a merchant 120.

Figure 11:
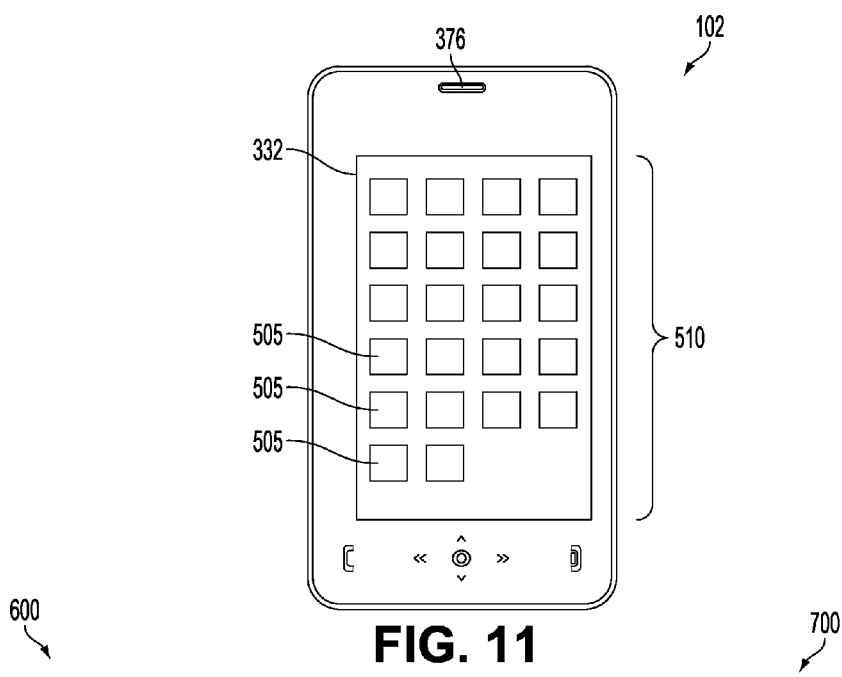
FIG. 11 is a diagram of a touch screen display for a client portable computing device.

FIG. 11 is a diagram of a touch screen display 432 for a client portable computing device 102. As shown, the client portable computing device 102 may include a menu or listing 510 of program icons 505. The client portable computing device 102 also includes a headset or speaker 476 that may be positioned next to a user's ear for listening to a mobile phone conversation.

Figure 12:
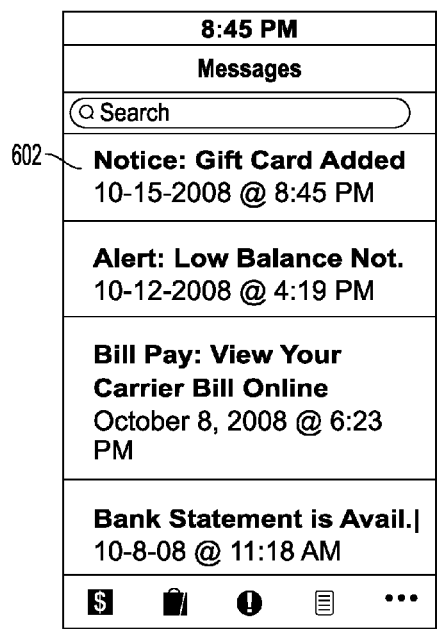
FIG. 12 is a diagram of a message screen.

Referring now to FIG. 12, this figure is a diagram of a message screen 600. The message screen 600 may be accessed by selecting a message option or message icon, such as one of the program icons 505 as illustrated in FIG. 12. The message screen 600 may include a listing of various types of messages that may be received and monitored in connection with the mobile wallet 114 stored in the client portable computing device 102. The exemplary messages illustrated in FIG. 12 include a stored value account notice 602, a balance alert, a bill pay alert, and a bank statement hypertext link.

Figure 13:
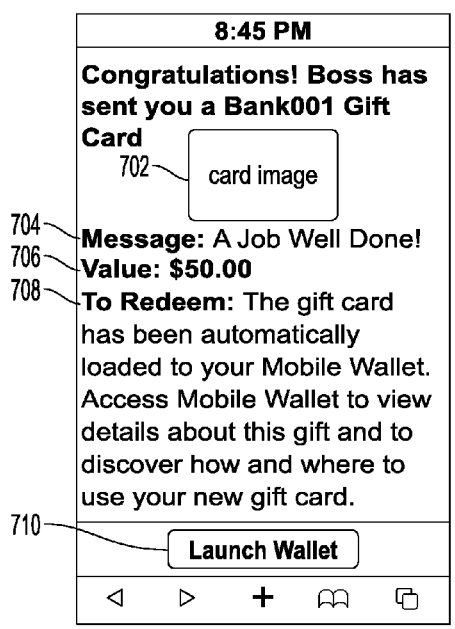
FIG. 13 is a diagram of a detailed message screen that highlights the details of the stored value account notice of FIG. 12.

When a user selects one of the listed messages, such as the stored value account notice 602, a message detail screen such as screen 700 of FIG. 13 may be generated. The message screen 600 may also support one or more icons at the bottom of the screen, such as a dollar sign, purse icon, exclamation point icon, or other icon which may launch other software applications on the client portable computing device 102.

FIG. 13 is a diagram of a detailed message screen 700 that highlights the details of the stored value account notice 602 as illustrated in FIG. 12. The detailed message screen 700 is generated in response to the stored value account notice 602 being selected may include a virtual token 702, a personalized message 704, a text based listing of value 706, and instructions 708 on how to redeem the stored value account.

As discussed above, according to is an exemplary aspect, a CPCD 102B may purchase a stored value account 142A (that may be referred to as a virtual gift card) and send the stored value account 142B to another CPCD 102B. A user selects a stored value account 142A and sends it to the recipient CPCD 102B where the received account is referred to as the stored value account 142B.

The CPCD 102B sending the stored value account 142B may generate a personalized token 702 and a personalized message 704 that may be received by the other CPCD 102B. In order to activate or use the stored value account 142 associated with the virtual stored value token 702, the CPCD 102B receiving the stored value account 142 may initiate the mobile wallet 114 by activating or touching the launch wallet button 710. The detailed message screen 700, like the message screen 600 of FIG. 14, may include additional icons at the bottom of the screen to activate various functions and/or different applications such as a back button, a forward button, an increase/decrease magnification icon, and a help button.

If the owner of the stored value account 142 exchanges the brand associated with the account 142, then the client portable computing device management server 106 may notify and revoke the sharing privileges with those participants who are currently sharing the stored value account 142 with the owner. The client portable computing device management server 106 may send a notification to the owner of a stored value account for purchases made by a shared account recipient with a shared version of the stored value account 142. This notification may include the time of purchase, date of the purchase, the city and state of the merchant location, and the purchase amount. Purchases made by the owner will generally not be provided to any of the shared account recipients. Further, purchases made by shared account recipients will usually not be provided to other shared account recipients of the stored value account 142.

Further, any personalizations associated with the stored value account 142 will generally only be provided to the intended recipient client portable computing device 102B. The personalizations will usually not be provided to any shared account recipients of the stored value account 142. Instead, the shared account recipient may receive a generic virtual token 702, such as illustrated in FIG. 13, that does not have any personalized element.

Certain steps in the processes or process flows described in this specification naturally precede others for the invention to function as described. However, the invention is not limited to the order of the steps described if such order or sequence does not alter the functionality of the invention. That is, it is recognized that some steps may performed before, after, or parallel (substantially simultaneously with) other steps without departing from the scope and spirit of the invention. In some instances, certain steps may be omitted or not performed without departing from the invention. Further, words such as "thereafter", "then", "next", etc. are not intended to limit the order of the steps. These words are simply used to guide the reader through the description of the exemplary method.

Additionally, one of ordinary skill in programming is able to write computer code or identify appropriate hardware and/or circuits to implement the disclosed invention without difficulty based on the flow charts and associated description in this specification, for example.

Therefore, disclosure of a particular set of program code instructions or detailed hardware devices is not considered necessary for an adequate understanding of how to make and use the invention. The inventive functionality of the claimed computer implemented processes is explained in more detail in the above description and in conjunction with the Figures which may illustrate various process flows.

In one or more exemplary aspects, the functions described may be implemented in hardware, software, firmware, or any combination thereof. If implemented in software, the functions may be stored on or transmitted as one or more instructions or code on a computer-readable medium. Computer-readable media include both computer storage media and communication media including any medium that facilitates transfer of a computer program from one place to another.

A storage media may be any available media that may be accessed by a computer. By way of example, and not limitation, such computer-readable media may comprise RAM, ROM, EEPROM, CD-ROM or other optical disk storage, magnetic disk storage or other magnetic storage devices, or any other medium that may be used to carry or store desired program code in the form of instructions or data structures and that may be accessed by a computer.

Also, any connection is properly termed a computer-readable medium. For example, if the software is transmitted from a website, server, or other remote source using a coaxial cable, fiber optic cable, twisted pair, digital subscriber line ("DSL"), or wireless technologies such as infrared, radio, and microwave, then the coaxial cable, fiber optic cable, twisted pair, DSL, or wireless technologies such as infrared, radio, and microwave are included in the definition of medium.

Disk and disc, as used herein, includes compact disc ("CD"), laser disc, optical disc, digital versatile disc ("DVD"), floppy disk and blu-ray disc where disks usually reproduce data magnetically, while discs reproduce data optically with lasers. Combinations of the above should also be included within the scope of computer-readable media.

Therefore, although selected aspects have been illustrated and described in detail, it will be understood that various substitutions and alterations may be made therein without departing from the spirit and scope of the present invention, as defined by the following claims.

What is claimed is:

1. A method for processing a transaction with a merchant portable computing device (MPCD), the method comprising:
   receiving customer data by a MPCD running a payment application and comprising a hand-held mobile point of sale (POS) device, wherein the customer data is associated with a customer payment account and transmitted to the MPCD from a customer portable computing device (CPCD), which is physically in the vicinity of the MPCD and is in a presentment mode for actively rendering a machine-readable token to the MPCD by a visual rendering of the machine-readable token on a screen of the CPCD such that a camera operating in the MPCD can read the machine-readable token;
   processing payment associated with a purchase transaction with the payment application on the MPCD using the customer data; and
   transmitting, over a computer network to a stored value account server associated with the customer payment account, payment information associated with the purchase transaction and comprising at least a portion of the customer data, wherein the payment information is used by the stored value account server for:
      verifying the MPCD and the purchase transaction, and
      completing the purchase transaction by verifying the CPCD remains actively in the presentment mode before subsequently authorizing a transfer of funds from the customer payment account to a merchant account associated with the MPCD, wherein verifying the CPCD remains actively in the presentment mode comprises the stored value account server communicating directly with the CPCD over the computer network to verify that the machine-readable token is still rendered on the display of the CPCD and the CPCD remains in the physical vicinity of the MPCD to authenticate the purchase.

2. The method of claim 1, further comprising:
   receiving a security application into a secure element within the MPCD to allow the MPCD to send encrypted transmissions.

3. The method of claim 1, further comprising:
   transmitting the payment application over a computer network to a plurality of MPCDs.

4. The method of claim 3, wherein each of the plurality of MPCDs is associated with one or more merchant accounts.

5. The method of claim 1, further comprising:
   receiving an activation code; and
   activating the payment application on the MPCD using the activation code.

6. The method of claim 5, wherein the step of activating the payment application on the MPCD further comprises:
   receiving the activation code at a merchant location;
   coupling the MPCD to a point-of-sale system; and
   providing the activation code from the MPCD to the point-of-sale system.

7. The method of claim 1, further comprising:
   activating the payment application on a plurality of MPCDs using one or more activation codes.

8. The method of claim 7, further comprising:
   coupling each MPCD to a point-of-sale system.

9. The method of claim 1, wherein the MPCD is part of a merchant point-of-sale system.

10. The method of claim 1, wherein the step of receiving customer data on the MPCD further comprises:
    receiving a virtual machine-readable token.

11. The method of claim 10, wherein the customer data is associated with a plurality of customer payment accounts.

12. The method of claim 11, further comprising:
    receiving a selection of one of the plurality of customer payment accounts to use for processing payment.

13. The method of claim 1, wherein the MPCD comprises at least one of a mobile telephone, a personal digital assistant, a pager, a smartphone, a navigation device, and a hand-held computer with a wireless connection or link.

14. A computer system for processing a transaction between a customer and a merchant, the computer system comprising:
    means for securely storing a payment application on a merchant portable computing device (MPCD), wherein the MPCD comprises a hand-held mobile point of sale (POS) device;
    means for receiving customer data by the MPCD, wherein the customer data is associated with a customer payment account and transmitted to the MPCD from a customer portable computing device (CPCD) that is physically in the vicinity of the MPCD and is in a presentment mode for actively rendering a machine-readable token to the MPCD by a visual rendering of the machine-readable token on a screen of the CPCD such that a camera operating in the MPCD can read the machine-readable token;
    means for operating the payment application on the MPCD to process a payment associated with a purchase transaction using the customer data; and
    means for transmitting, over a computer network to a stored value account server associated with the customer payment account, payment information associated with the purchase transaction and comprising at least a portion of the customer data, wherein the payment information is used by the stored value account server for:
       verifying the MPCD and the purchase transaction, and
       completing the purchase transaction by verifying the CPCD remains actively in the presentment mode before subsequently authorizing a transfer of funds from the customer payment account to a merchant account associated with the MPCD, wherein verifying the CPCD remains actively in the presentment mode comprises the stored value account server communicating directly with the CPCD over the computer network to verify that the machine-readable token is still rendered on the display of the CPCD and the CPCD remains in the physical vicinity of the MPCD to authenticate the purchase.

15. The computer system of claim 14, further comprising: means to activate the payment application on the MPCD to enable it to process payment.

16. The computer system of claim 14, wherein the MPCD is associated with a merchant account.

17. The computer system of claim 16, wherein the merchant account is associated with a merchant financial account.

18. The computer system of claim 14, wherein the customer data further comprises data associated with a plurality of customer payment accounts.

19. The computer system of claim 18, further comprising means to select which of the plurality of customer payment accounts to use for the payment to the merchant.

20. The computer system of claim 14, wherein the customer data is part of a virtual machine-readable token generated by a customer portable communication device.

21. The computer system of claim 14, wherein the MPCD comprises at least one of a mobile telephone, a personal digital assistant, a pager, a smartphone, a navigation device, and a hand-held computer with a wireless connection or link.

22. A computer program product comprising a computer usable device having a computer readable program code embodied therein, said computer readable program code executable to implement a method for processing a transaction with a merchant portable computing device (MPCD), the method comprising:
 executing a payment application on an MPCD, wherein the MPCD comprises a hand-held mobile point of sale (POS) device;
 receiving customer data by the MPCD, wherein the customer data is associated with a customer payment account and transmitted to the MPCD from a customer portable computing device (CPCD) that is physically in the vicinity of the MPCD and is in a presentment mode for actively visually rendering a machine-readable token to the MPCD by a visual rendering of the machine-readable token on a screen of the CPCD such that a camera operating in the MPCD can read the machine-readable token;
 processing payment associated with a purchase transaction using the customer data; and
 transmitting, over a computer network to a stored value account server associated with the customer payment account, payment information associated with the purchase transaction and comprising at least a portion of the customer data, wherein the payment information is used by the stored value account server for:
 verifying the MPCD and the purchase transaction, and completing the purchase transaction by verifying the CPCD remains actively in the presentment mode before subsequently authorizing a transfer of funds from the customer payment account to a merchant account associated with the MPCD, wherein verifying the CPCD remains actively in the presentment mode comprises the stored value account server communicating directly with the CPCD over the computer network to verify that the machine-readable token is still rendered on the display of the CPCD and the CPCD remains in the physical vicinity of the MPCD to authenticate the purchase.

23. The computer program product of claim 22, wherein the method implemented by the program code further comprises:
 receiving a security application into the secure element within the MPCD to allow the MPCD to send encrypted transmissions.

24. The computer program product of claim 22, wherein MPCD is associated with a merchant account.

25. The computer program product of claim 22, wherein the MPCD is associated with a plurality of merchant accounts.

26. The computer program product of claim 2, wherein the merchant account associated with the MPCD is linked with one or more merchant financial accounts.

27. The computer program product of claim 26, wherein processing payment to the merchant with the payment application on the MPCD further comprises selecting one of the one or more merchant financial accounts into which to deposit the payment to the merchant.

28. The computer program product of claim 22, wherein the method implemented by the program code further comprises:
 receiving an activation code; and
 activating the payment application on the MPCD using the activation code.

29. The computer program product of claim 28, wherein activating the payment application on the MPCD further comprises:
 receiving the activation code at a merchant location;
 coupling the MPCD to a point-of-sale system; and
 providing the activation code to the point-of-sale system site using the MPCD.

30. The computer program product of claim 22, wherein the MPCD is part of a merchant point-of-sale system.

31. The computer program product of claim 2, wherein receiving customer data on the MPCD further comprises receiving a virtual machine-readable token from a customer portable communication device.

32. The computer program product of claim 31, wherein the customer data is associated with a plurality of customer payment accounts.

33. The computer program product of claim 32, wherein the method implemented by the program code further comprises:
 receiving a selection of one of the plurality of customer payment accounts to use for processing payment.

34. The computer program product of claim 22, wherein the program code is at least partly executed on at least one of a mobile telephone, a personal digital assistant, a pager, a smartphone, a navigation device, and a hand-held computer with a wireless connection or link.

* * * * *